(12) United States Patent
Goff et al.

(10) Patent No.: US 8,979,034 B2
(45) Date of Patent: Mar. 17, 2015

(54) STICKY BOOM NON-COOPERATIVE CAPTURE DEVICE

(75) Inventors: Jonathan Andrew Goff, Lafayette, CO (US); Michael Ivan Judson, Jr., Logan, UT (US); William George Bolton, Longmont, CO (US); Steven Wendell Hoyt, Louisville, CO (US); Forrest Peter Ryan, Boulder, CO (US)

(73) Assignee: Altius Space Machines, Broomfield, CO (US)

( * ) Notice: Subject to any disclaimer, the term of this patent is extended or adjusted under 35 U.S.C. 154(b) by 575 days.

(21) Appl. No.: 13/312,984

(22) Filed: Dec. 6, 2011

(65) Prior Publication Data

US 2012/0076629 A1 Mar. 29, 2012

(51) Int. Cl.
*B25J 18/02* (2006.01)
*B25J 9/16* (2006.01)
*B25J 15/00* (2006.01)
*B64G 1/64* (2006.01)
*B64G 4/00* (2006.01)

(52) U.S. Cl.
CPC ............. *B25J 18/025* (2013.01); *B25J 9/1612* (2013.01); *B25J 15/0052* (2013.01); *B64G 1/646* (2013.01); *B64G 4/00* (2013.01)
USPC ...................................................... 244/172.6

(58) Field of Classification Search
CPC ..................................................... B64G 1/222
USPC ...................................................... 244/172.6
See application file for complete search history.

(56) References Cited

U.S. PATENT DOCUMENTS

| | | | | |
|---|---|---|---|---|
| 4,259,876 | A * | 4/1981 | Belyanin et al. | ............. 74/469 |
| 4,657,211 | A | 4/1987 | Fuldner et al. | |
| 4,865,514 | A * | 9/1989 | Tsuchihashi et al. | ......... 414/736 |
| 4,964,062 | A * | 10/1990 | Ubhayakar et al. | ........... 700/249 |
| 5,145,130 | A | 9/1992 | Purves | |
| 5,390,288 | A * | 2/1995 | Toda et al. | .................... 700/258 |
| 5,509,707 | A | 4/1996 | Schauer | |
| 6,523,784 | B2 * | 2/2003 | Steinsiek et al. | ........... 244/172.4 |
| 6,845,303 | B1 | 1/2005 | Byler | |
| 7,168,660 | B2 * | 1/2007 | Bischof et al. | ............. 244/158.2 |
| 7,479,198 | B2 | 1/2009 | Guffrey et al. | |
| 7,551,419 | B2 | 6/2009 | Pelrine et al. | |

(Continued)

OTHER PUBLICATIONS

Directional adhesion for climbing: theoretical and practical considerations. Sangbae Kim et al. Aug. 8, 2007.*

(Continued)

*Primary Examiner* — Justin Benedik
(74) *Attorney, Agent, or Firm* — Thomas J. Lavan

(57) ABSTRACT

A device for non-cooperatively capturing an object is provided. The device includes a boom having a fixed end coupled to a structure and a free end. The boom also includes boom deployers for moving the fixed end of the boom relative to the structure. The device also includes a capture head, coupled to the free end of the boom, and a control apparatus. The control apparatus controls the boom deployers and capture head to move the capture head in close proximity to the object. The control apparatus moves the capture head in closer proximity to the object if the capture head is not close enough to the object to capture the object. The control apparatus minimizes forces applied to the object, and activates a non-cooperative capture device. The non-cooperative capture device makes initial contact with the object, establishes intimate contact with the object, and captures the object.

20 Claims, 16 Drawing Sheets

(56) References Cited

U.S. PATENT DOCUMENTS

| | | | |
|---|---|---|---|
| 7,686,255 | B2 | 3/2010 | Harris |
| 7,773,363 | B2 | 8/2010 | Pelrine et al. |
| 2003/0229420 | A1 | 12/2003 | Buckingham et al. |
| 2005/0097833 | A1* | 5/2005 | Campbell et al. ............... 52/118 |
| 2006/0237126 | A1 | 10/2006 | Guffrey et al. |
| 2007/0040067 | A1 | 2/2007 | D'Ausilio et al. |
| 2007/0063375 | A1 | 3/2007 | Tuma |
| 2007/0164164 | A1* | 7/2007 | Cepollina et al. .......... 244/158.1 |
| 2008/0169003 | A1* | 7/2008 | Curtis ............................... 134/1 |
| 2008/0237400 | A1* | 10/2008 | Gryniewski et al. ....... 244/172.2 |
| 2009/0166476 | A1* | 7/2009 | Termini ..................... 244/158.6 |
| 2010/0193640 | A1 | 8/2010 | Atmur et al. |
| 2012/0205492 | A1* | 8/2012 | Gelon ........................ 244/171.8 |

OTHER PUBLICATIONS

Compliant robotic devices, and electroadhesion, G. J. Monkman, Robotics research unit, Department of electronic engineering, University of Hull, Hull H46 7RX (UK), published in Robotica 1992, vol. 10, pp. 183-185, received in final form Feb. 18, 1991, downloaded Sep. 28, 2011.

Tilted Janus polymer pillars, Myoung-Woon Moon, Tae-GonCha, Kwang-Ryeol Lee, Ashkan Vaziri, and Ho-Young Kim, www.rsc.org/softmatter.

Book: Force Control of Robotic Systems, 1997, Dmitri Gorinevsky, Alexander Formalsky, and Anatoli Schneider, CRC Press.

Smooth vertical surface climbing with directional adhesion, Sangbae Kim, Matthew Spenko, Salomon Trujillo, Barrett Heyneman, Daniel Santos, Mark R. Cutkosky, IEEE Transactions on robotics, vol. 24 No. 1, Feb. 2008.

Directional adhesion for climbing: theoretical and practical considerations, Daniel Santos, Matthew Spenko, Aaron Parness, Sangbae Kim, and Mark R. Cutkosky, Center for design and research, Stanford University, Stanford, California, 94305-2232, received in final form Aug. 8, 2007.

Climbing rough vertical surfaces with hierarchical directional adhesion, Alan Asbeck, Sanjay Dastoor, Aaron Parness, Laurel Fullerton, Noe Esparza, Daniel Soto, Barrett Heyneman, Mark Cutkosky, Stanford University, Stanford, California, 94305.

Hierarchically branched Gecko-like structures imprinted using porous alumina templates, A. Y. Y. Ho, I. Rodriguez, Y. C. Lam, Institute of materials research and engineering, Agency for Science, Technology and research (A*STAR), 3 Research Link, Singapore 117602, School of mechanical and aerospace engineering, Nanyang technological university, NSTI-Nanotech 2010, www.nsti.org, ISBN 978-1-4398-3402-2 vol. 2, 2010.

Flexible carbon-nanofiber connectors with Anisotropic adhesion properties, Hyunhyub Ko, Zhenxing Zhang, Johnny C. Ho, Kuniharu Takei, Rehan Kapadia, Yu-Lun Chueh, Weizhen Cao, Brett A. Cruden, Ali Javey, Wiley Interscience, www.small-journal.com, Small 2009, Oct. 2, 2009, 2009 Wiley-VCH Verlag GmBH & Co., KGaA, Weinheim.

Hybrid core-multishell nanowire forests for electrical connector applications, Rehan Kapadia, Hyunhyub Ko, Yu-Lun Chueh, Johnny C. Ho, Toshitake Takahashi, Zhenxing Zhang, Ali Javey, Department of electrical engineering and computer sciences, University of California at Berkeley, Published Jul. 1, 2009, Applied Physics Letters 94, 263110 (2009), 2009 American Institute of Physics.

Wet and dry adhesion properties of self-selective anoware connectors, Hyunhyub Ko, Zhenxing Zhang, Yu-Lun Chueh, Johnny C. Ho, Jongho Lee, Ronald S. Fearing, Ali Javey, Advanced functional Materials 2009, Published Aug. 25, 2009, 19, 3098-3 102, www.afm-journal.de, Wiley Interscience, 2009 Wiley-VCH Verlag GmBH & Co, KGaA, Weinheim.

Engineering issues for all major modes of in-situ space debris capture, Marshall H. Kaplan, Bradley Boone, Robert Brown, Thomas B. Criss, Edward W. Tunstel, John Hopkins University Applied Physics Laboratory, Laurel, Maryland, 20732, AIAA 2010-8863, AIAA Space 2010 Conference and Exposition, Aug. 30-Sep. 2, 2010, Anaheim, California.

Book: Introduction to robotics: Mechanics and Control (3rd Edition), 2005, John J. Craig, Pearson/Prentice Hall.

Book: Robot Force Control, 1999, Bruno Siciliano and Luigi Villani, Kluwer Academic Press.

Official Action for U.S. Appl. No. 13/706,956, mailed Nov. 20, 2014.

* cited by examiner

Fig. 1a  Single segment sticky boom
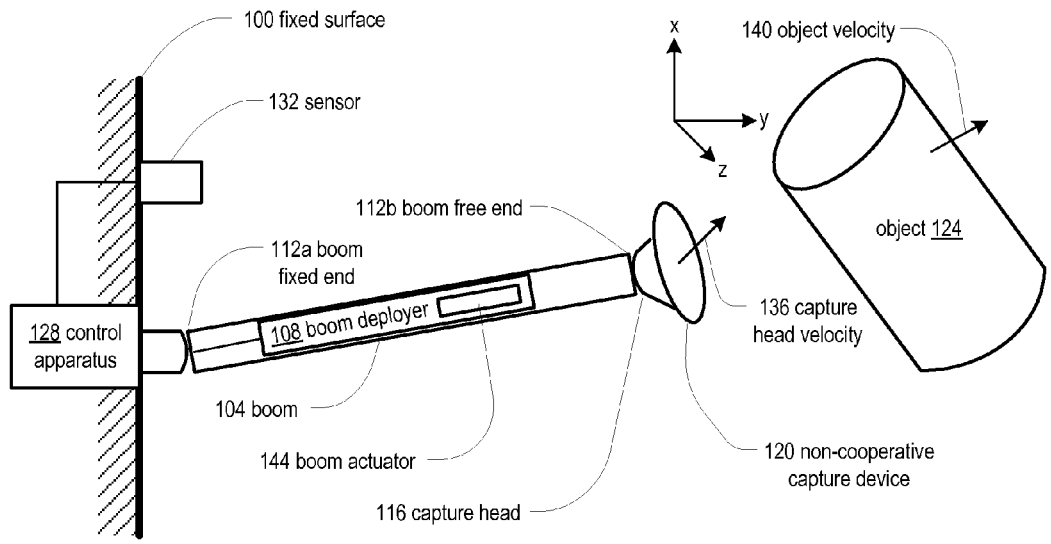
Fig. 1b  Multiple segment sticky boom
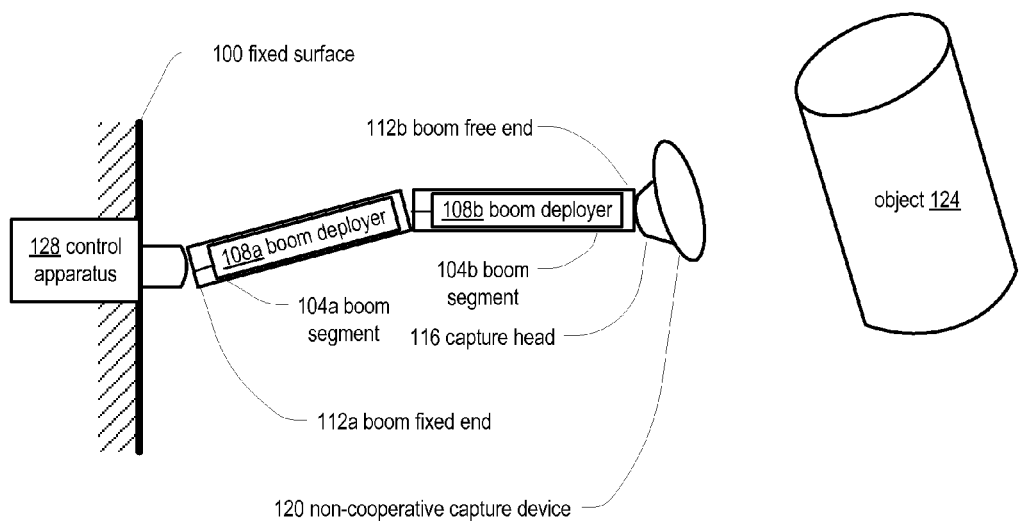

*Fig. 2a   Single segment extendable/retractable sticky boom*
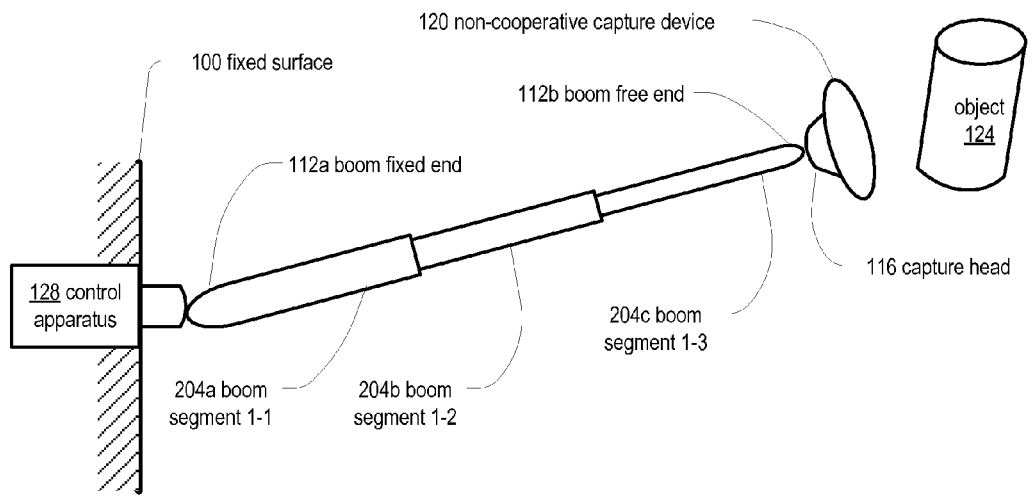
*Fig. 2b   Multiple segment extendable/retractable sticky boom*
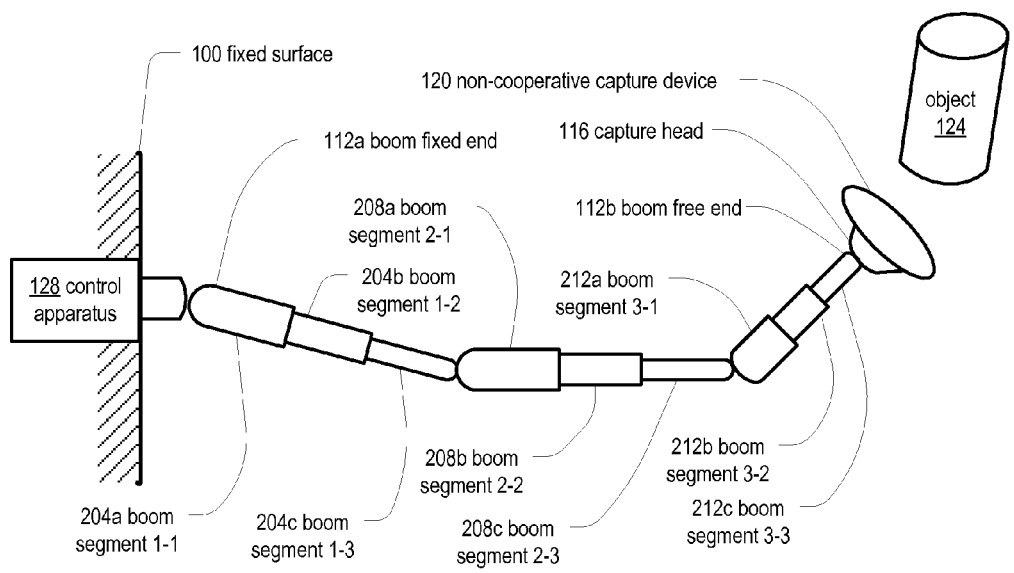

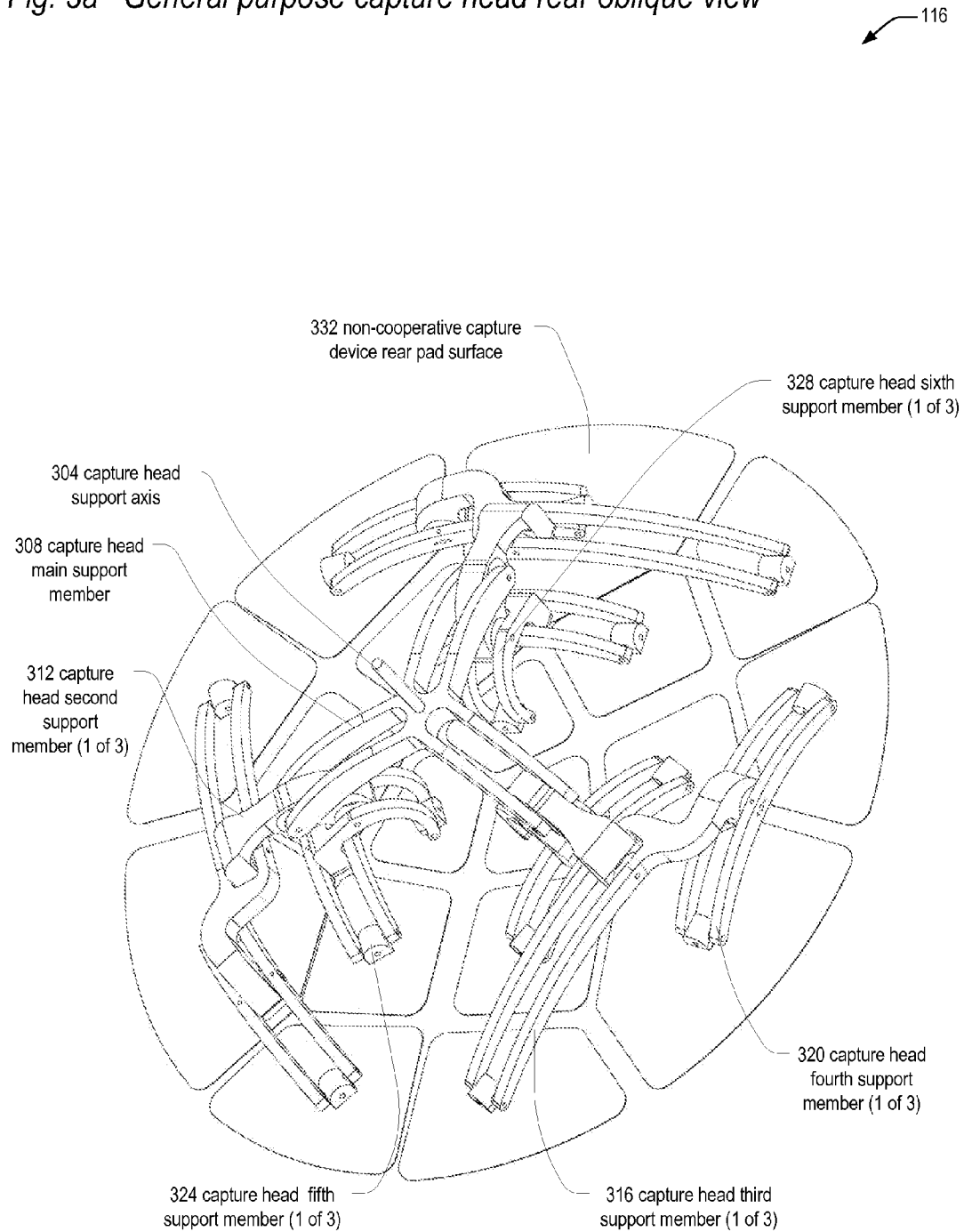
Fig. 3a  General purpose capture head rear oblique view

*Fig. 3b  General purpose capture head rear view*
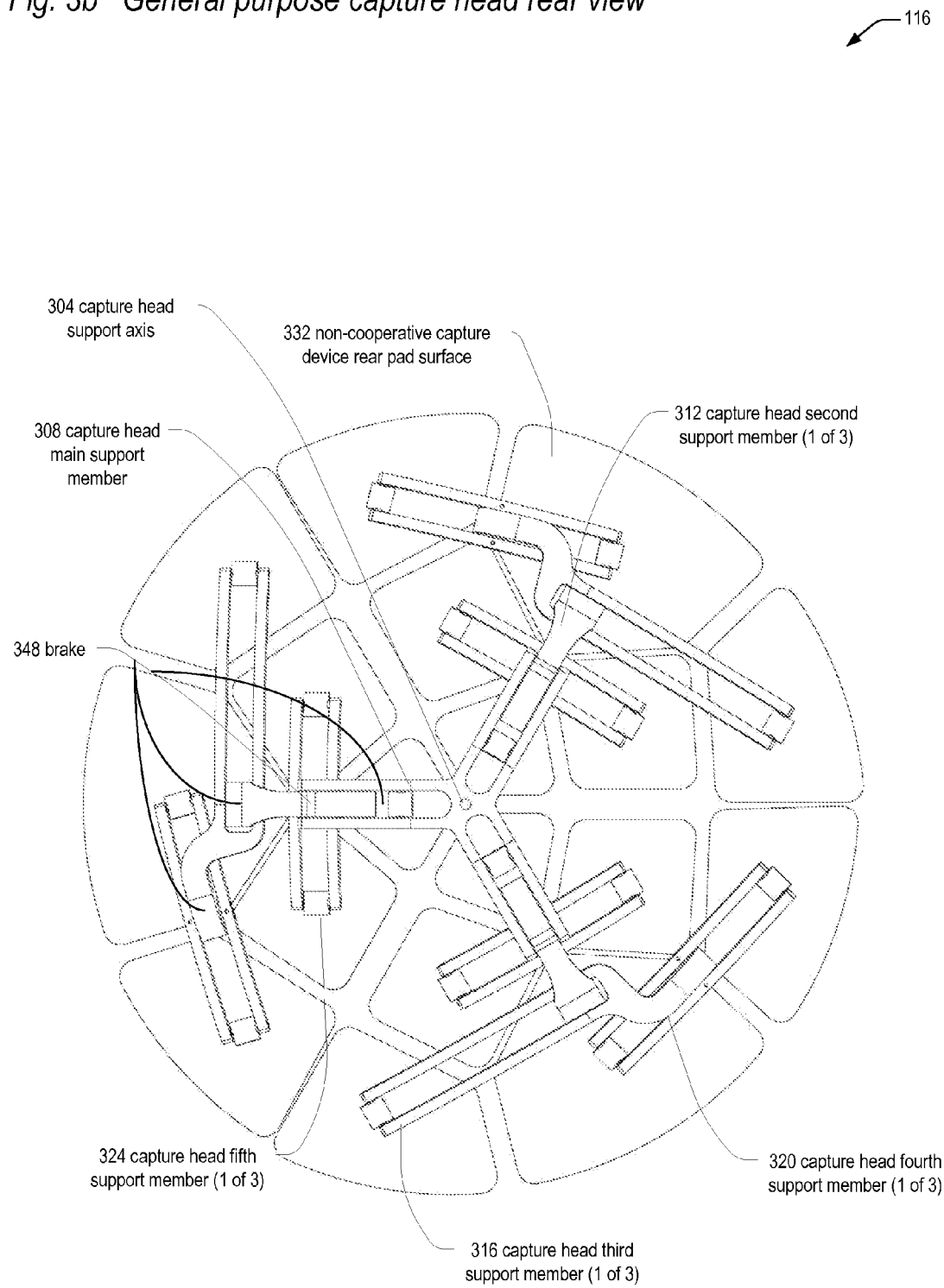

Fig. 3c  General purpose non-cooperative capture device
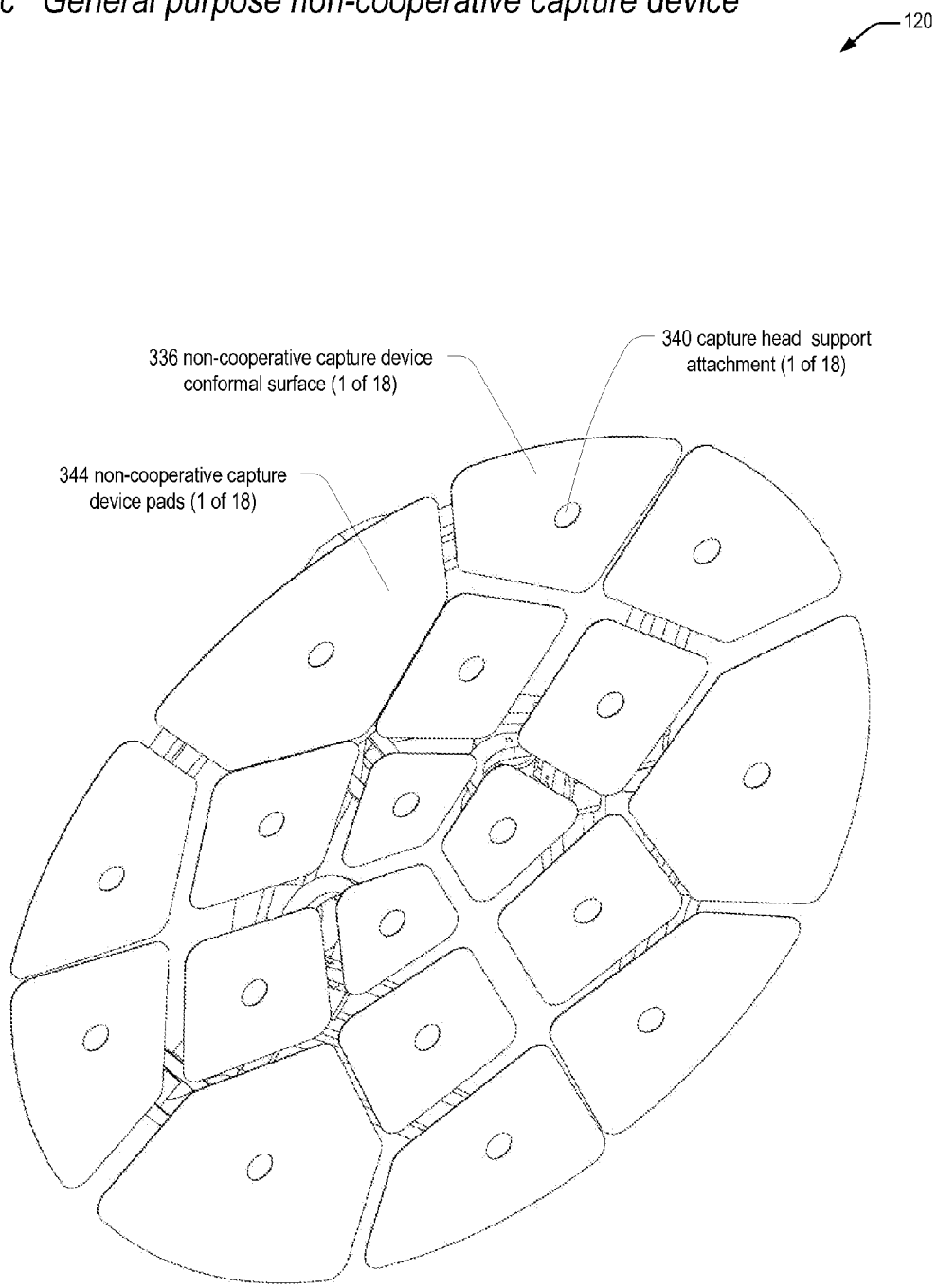

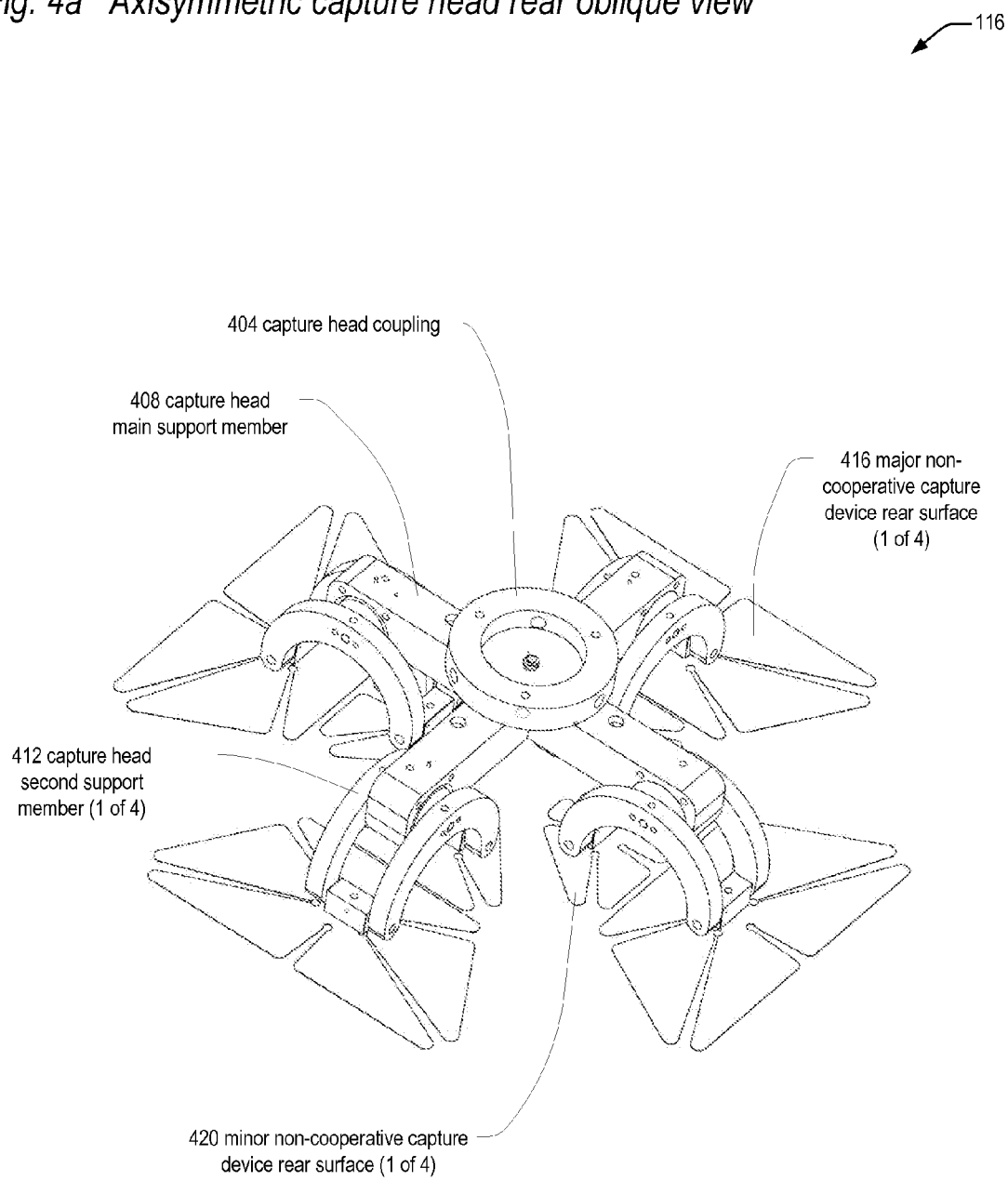
Fig. 4a Axisymmetric capture head rear oblique view

*Fig. 4b  Axisymmetric capture head rear view*
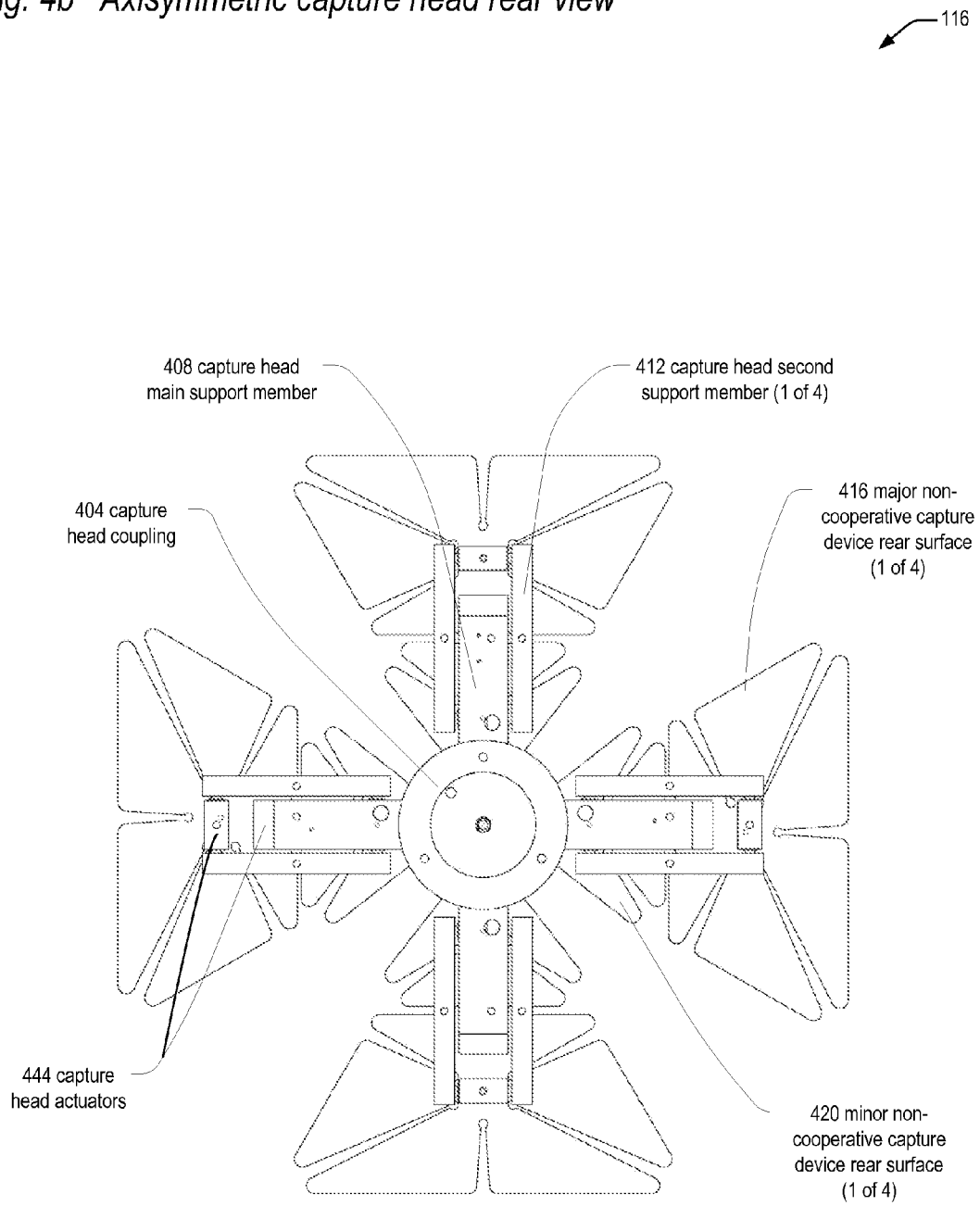

Fig. 4c  Axisymmetric non-cooperative capture device
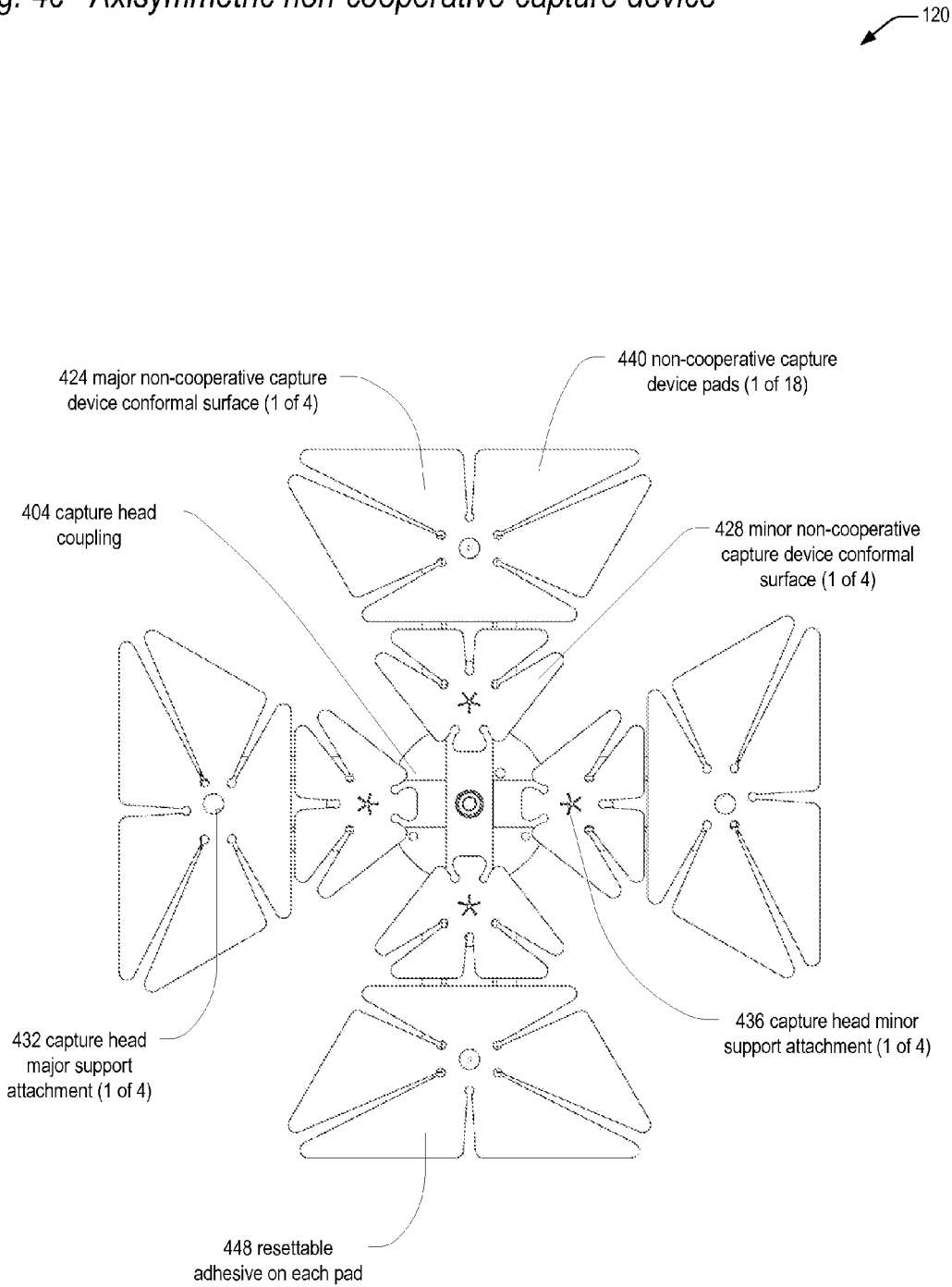

*Fig. 5  Capture head components*
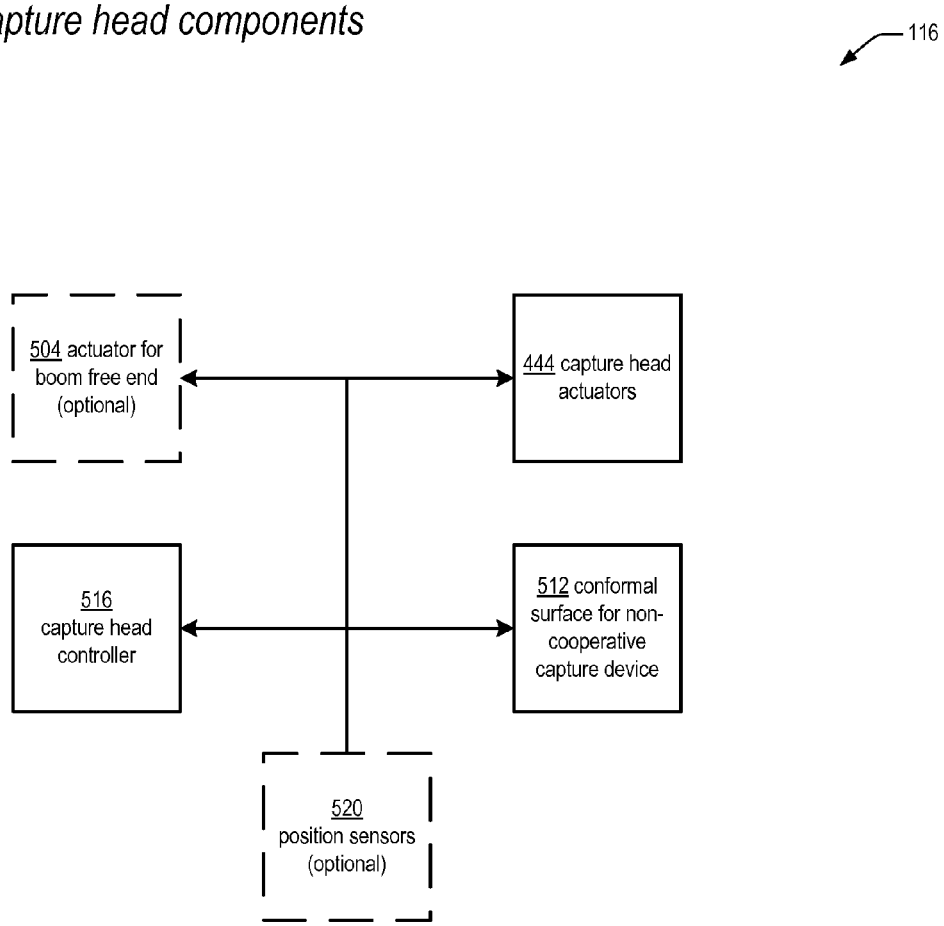

Fig. 6a  Capture head controller
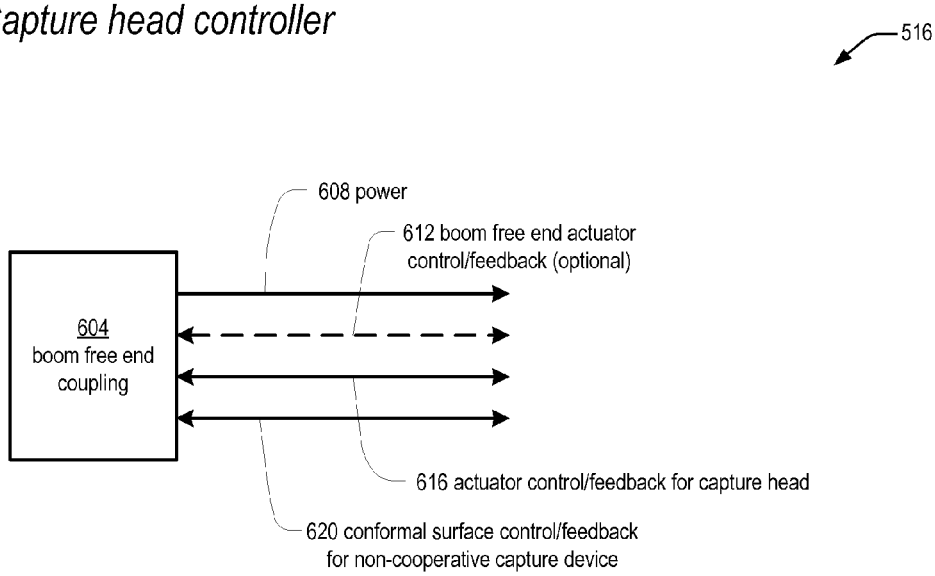
Fig. 6b  Capture head controller
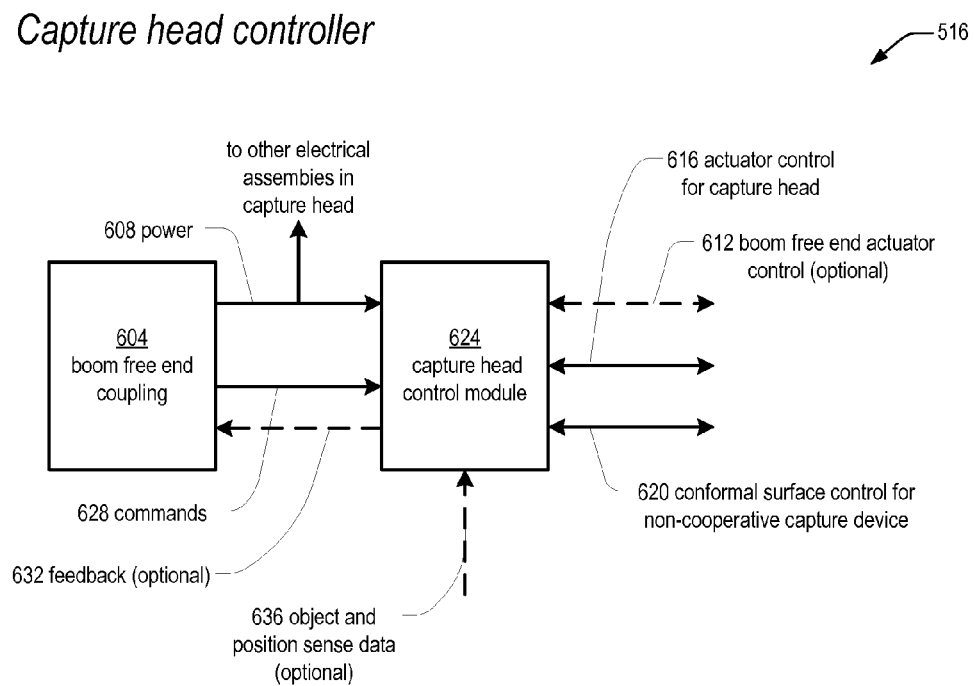

*Fig. 6c   Capture head controller*
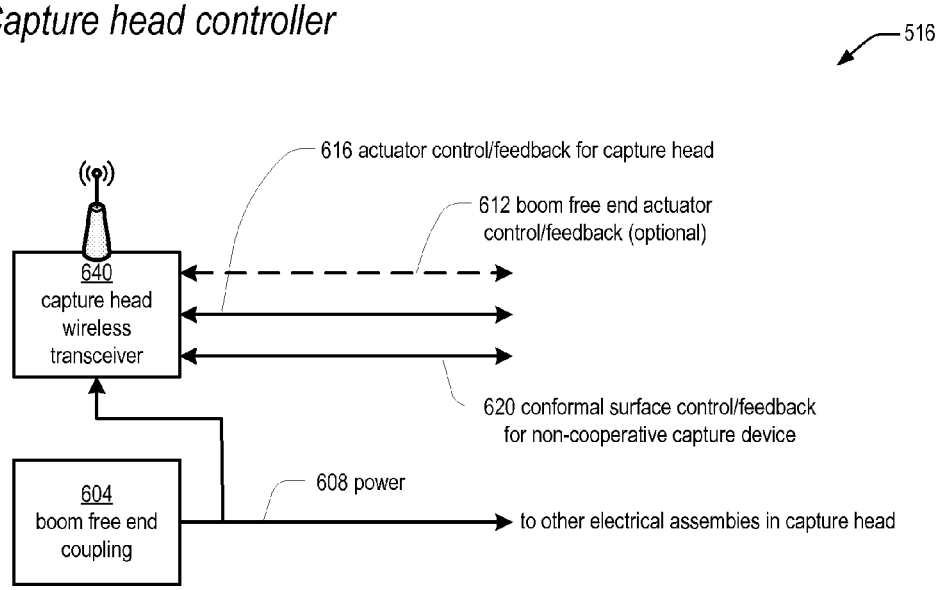
*Fig. 6d   Capture head controller*
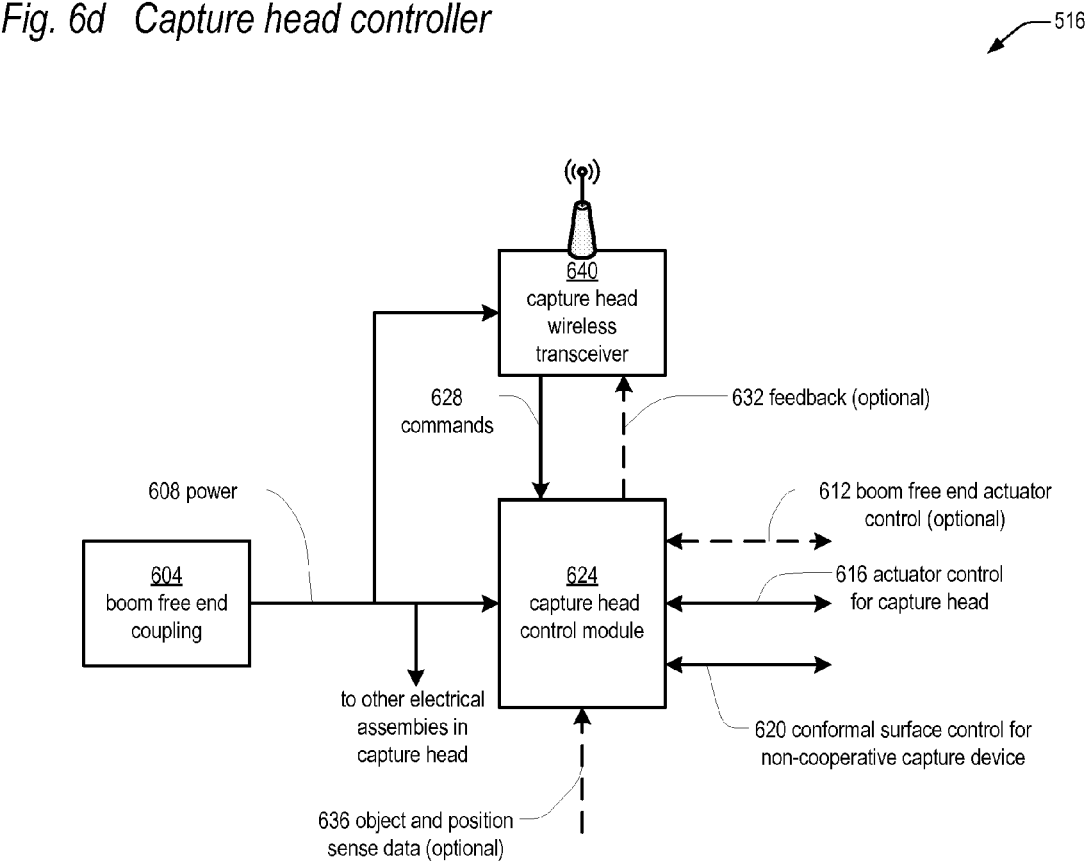

Fig. 7 Capture head control module
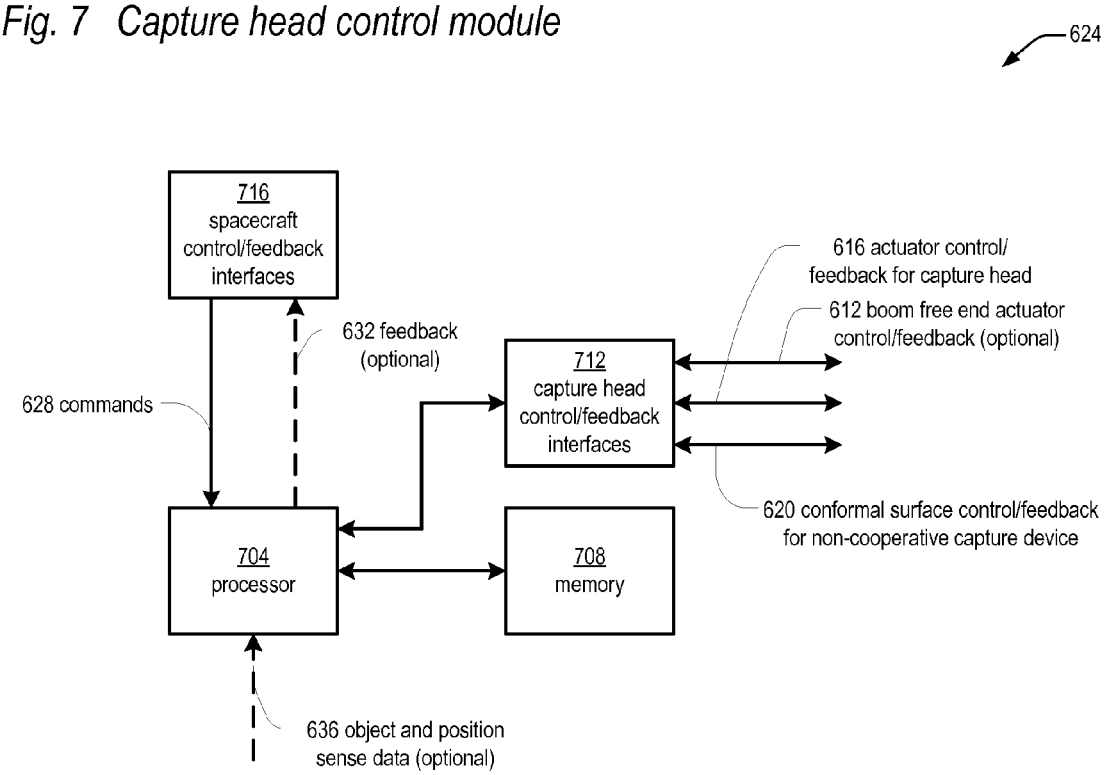

Fig. 8a  Control apparatus
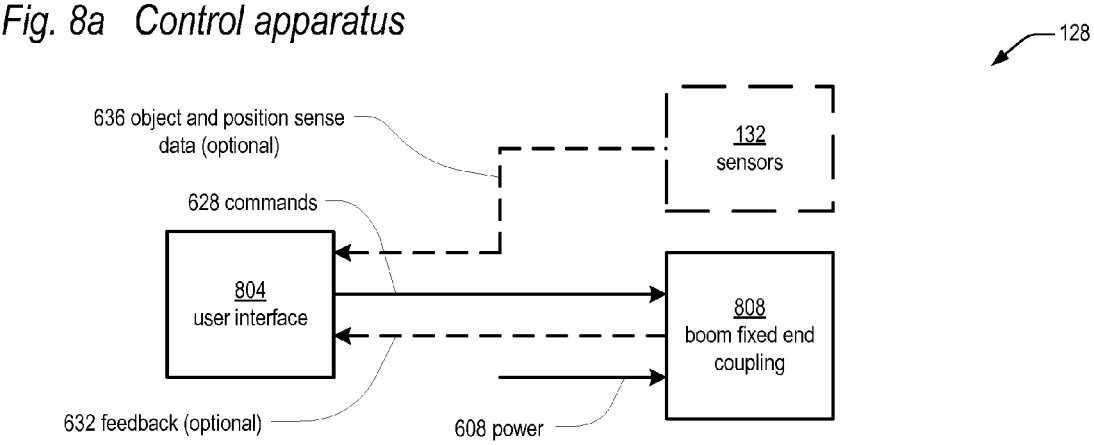
Fig. 8b  Control apparatus
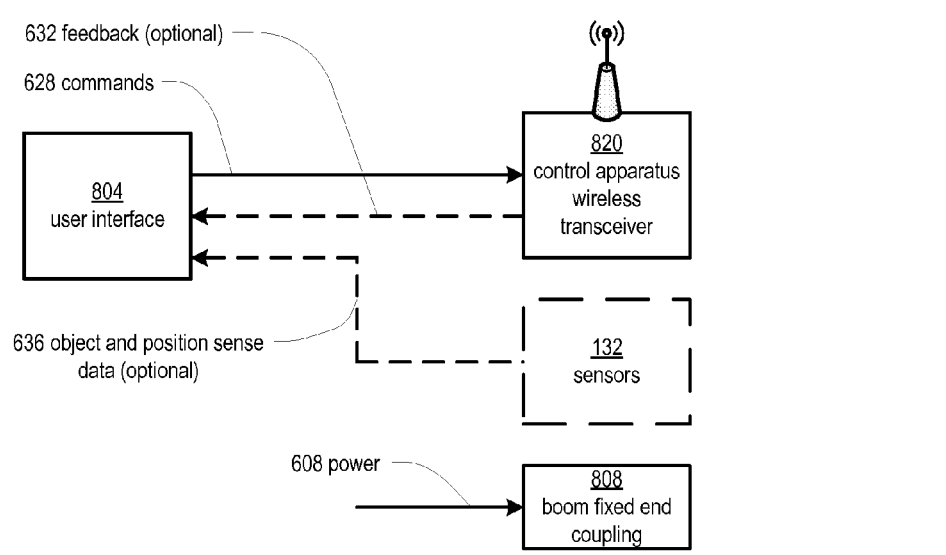

Fig. 9 Object capture process with simple capture head
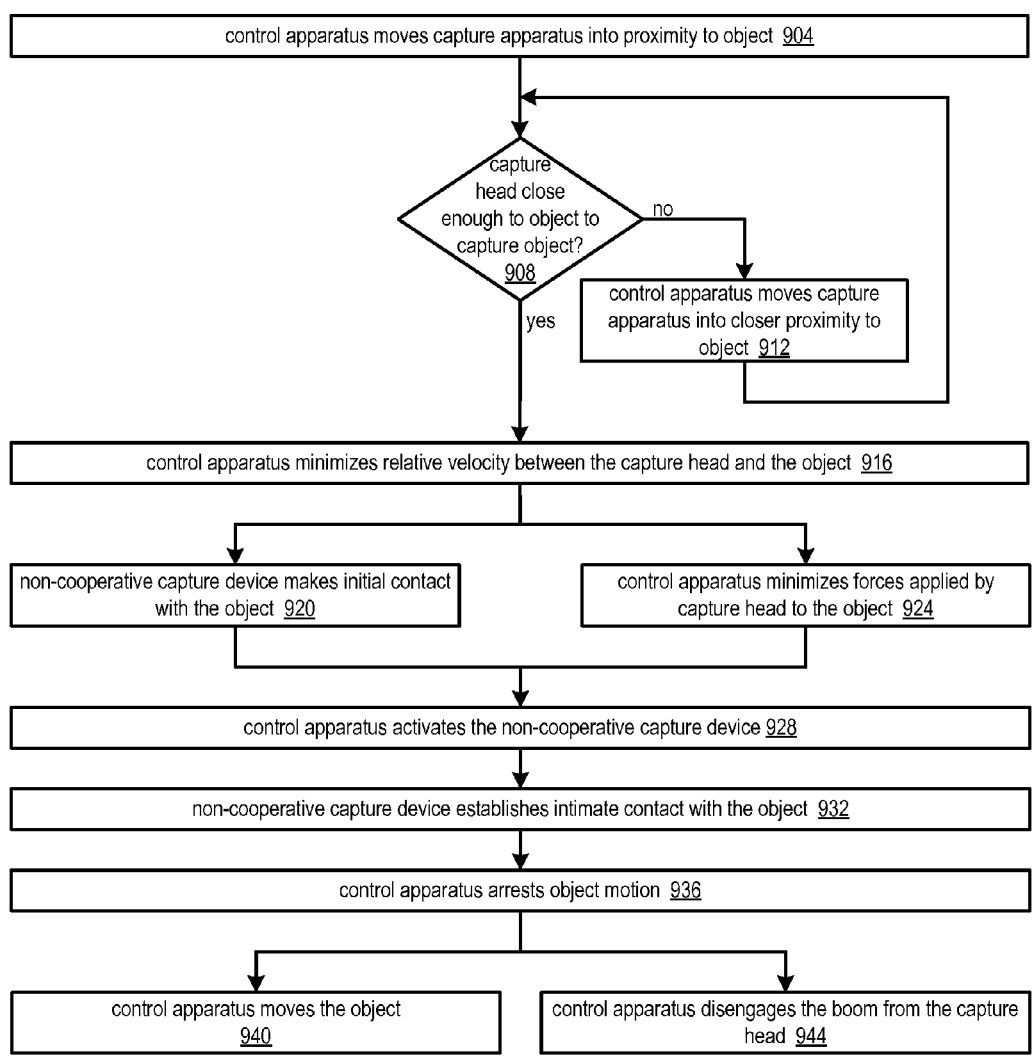

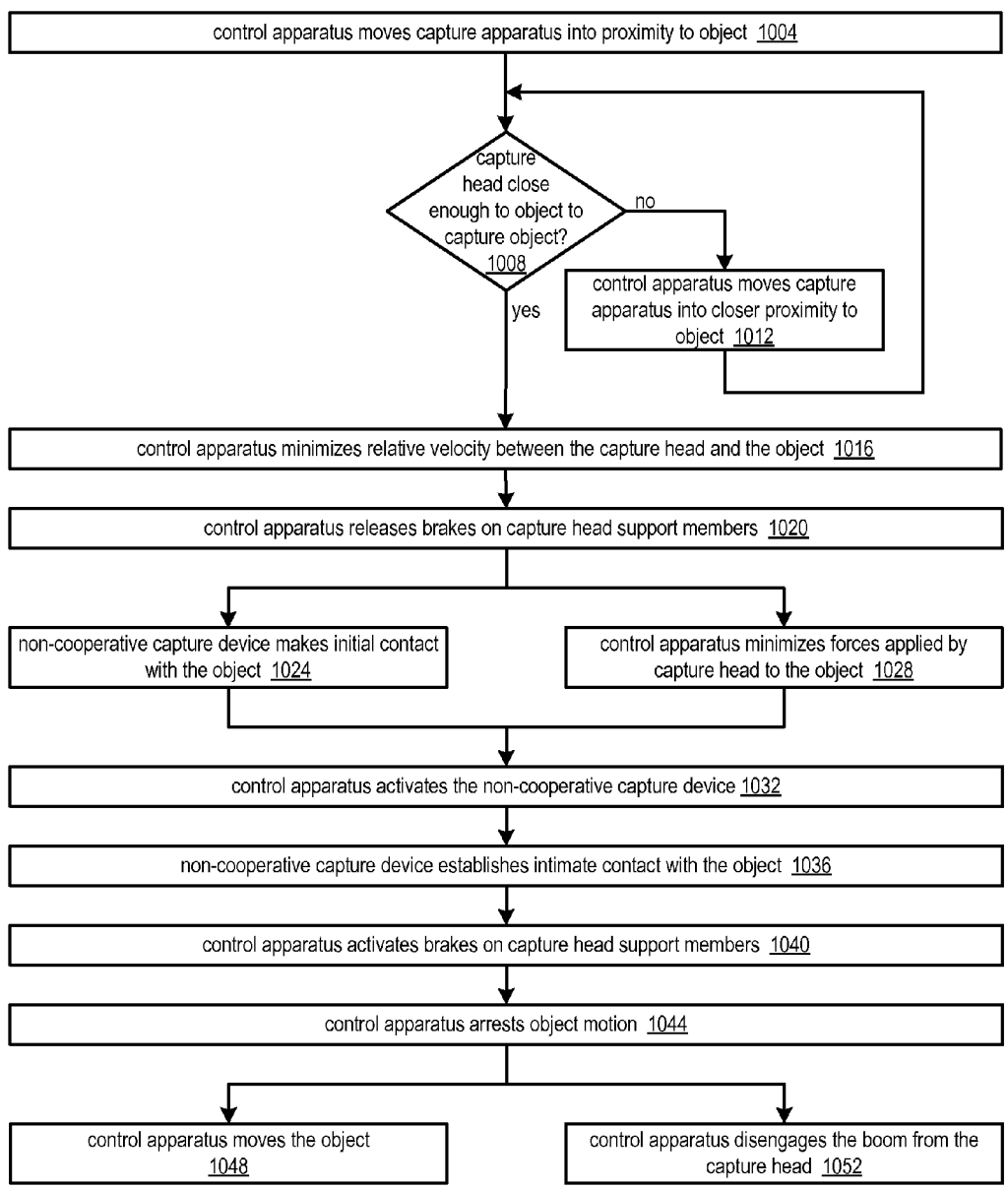
Fig. 10 Object capture passive process

*Fig. 11 Object capture active process*
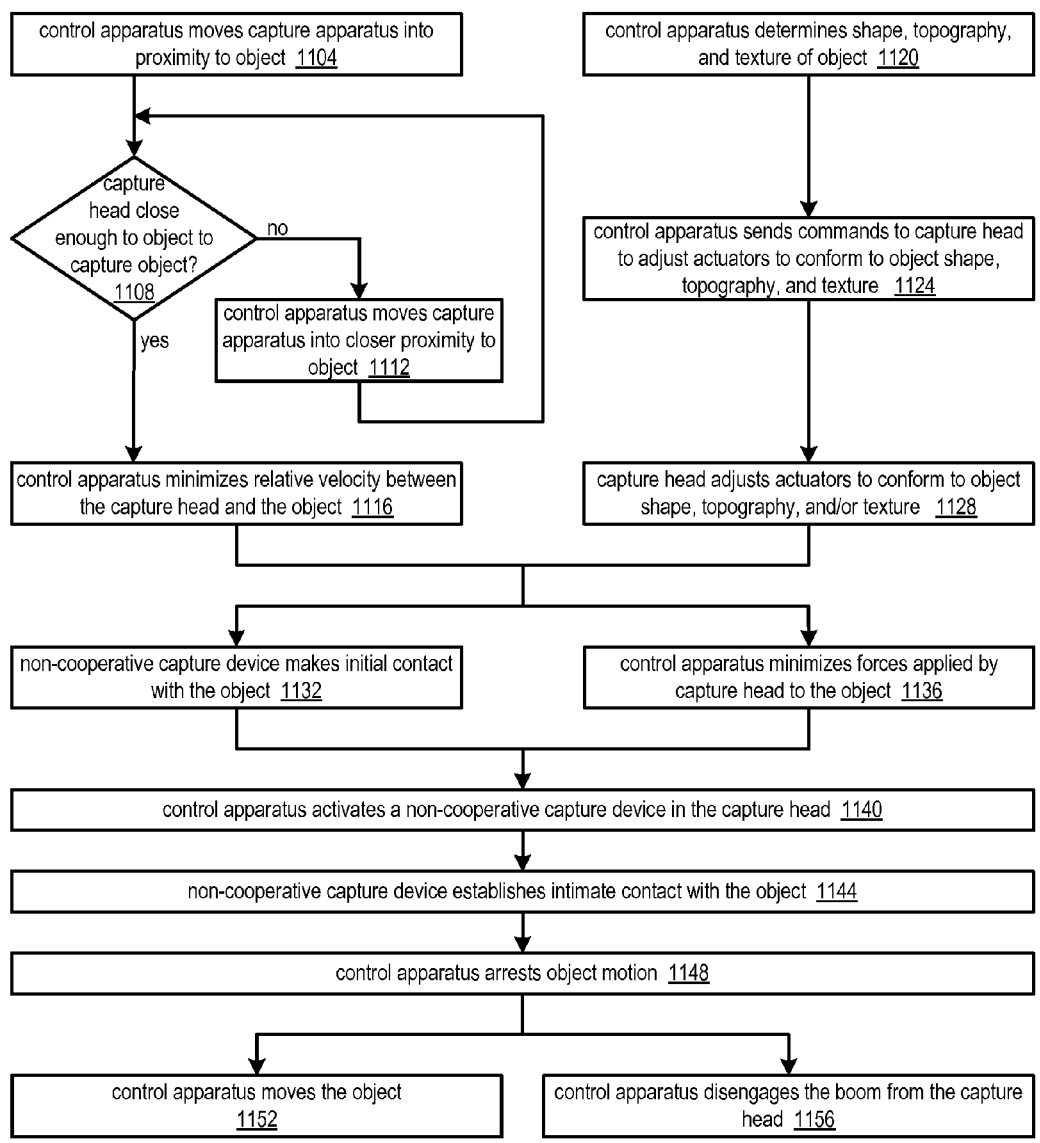

STICKY BOOM NON-COOPERATIVE CAPTURE DEVICE

FIELD

The present invention is directed to object capture. In particular, the present invention is directed to methods and apparatuses for non-cooperatively capturing objects in low or zero gravity environments as well as terrestrial environments.

BACKGROUND

Robotic arms have been in existence for several decades. Many industries utilize robotic arms to speed production, improve product assembly quality, and manipulate hazardous objects and materials. Most robotic arms in the world are designed for heavy, repetitive manufacturing work, and handle tasks that are difficult, dangerous, or boring to human beings.

A typical robotic arm is controlled by a computer by activating individual step motors or actuators connected at each joint. At a minimum, a robotic arm has a single segment and a joint at each end. Larger robotic arms often use hydraulics or pneumatics to control arm motion. Robotic arms often use motion sensors to regulate movement in precise increments.

A robotic arm, called the Shuttle Remote Manipulator System (SRMS) or Canadarm, was used on the Space Shuttle to maneuver a payload from the payload bay of the orbiter to a deployment position and then release the payload. The SRMS is also able to grapple certain payloads, maneuver it to the payload bay of the orbiter, and berth it. SRMS was first used on the second Space Shuttle mission launched Nov. 13, 1981. The SRMS robotic arm is 15.2 meters (50 feet, 3 inches) long and 38 centimeters (15 inches) in diameter, and has six degrees of freedom. It weighs 410 kilograms (905 pounds). Although the original SRMS was capable of deploying or retrieving payloads weighing up to 32.5 tons, the system was later upgraded to increase payload capacity up to 293 tons in order to support space station assembly operations.

A later robotic arm, the Mobile Servicing System (MSS) or Canadarm2, is used on the International Space Station (ISS). Launched to the ISS in 2001, it plays a key role in station assembly and maintenance. The MSS moves equipment and supplies around the station, supports astronauts working in space, and services instruments and payloads attached to the ISS. The MSS is self-relocatable, and can move end-over-end to reach many parts of the ISS. The ISS is planned to also utilize other robotic arms such as the Japanese Experimental Module Remote Manipulator System (JEM-RMS) and the European Robotic Arm (ERA).

Current technology robotic arms utilize capture heads incorporating mechanical grippers, where mechanical force between two or more surfaces are used to positively capture and move objects. Mechanical grippers are suitable to capture known objects of predictable size, shape, and orientation and having robust attachment surfaces.

SUMMARY

The present invention is directed to solving disadvantages of the prior art. In accordance with embodiments of the present invention, a device for non-cooperatively capturing an object is provided. The device includes a boom, where the boom includes a fixed end coupled to a structure, and a free end. The free end is able to move relative to the structure. The boom also includes one or more boom deployers for moving the fixed end of the boom relative to the structure. The device for non-cooperatively capturing an object also includes a capture head, coupled to the free end of the boom, and a control apparatus. The capture head includes a non-cooperative capture device. The control apparatus controls the one or more boom deployers and the capture head to move the capture head in proximity to the object. The control apparatus determines if the capture head is close enough to the object to capture the object, and moves the capture head in closer proximity to the object if the capture apparatus determines the capture head is not close enough to the object to capture the object. The control apparatus minimizes relative velocity between the capture head and the object, and activates a non-cooperative capture device in the capture head after the non-cooperative capture device makes initial contact with the object. The non-cooperative capture device establishes intimate contact between the capture head and the object, and the capture head arrests the object motion.

In accordance with another embodiment of the present invention, a method for non-cooperatively capturing an object is provided. The method includes utilizing a control apparatus to move a capture apparatus into close proximity to the object. The capture apparatus includes a boom, where the boom includes a fixed end attached to a structure, and a free end. The free end is able to move relative to the structure. The capture apparatus also includes a boom deployer for moving the free end of the boom; and a capture head, coupled to the free end of the boom. The capture head includes a non-cooperative capture device. The method also includes determining if the capture head is close enough to the object to capture the object. If the capture head is not close enough to the object to capture the object, the control apparatus moves the capture head closer to the object. If the capture head is close enough to the object to capture the object, the method provides minimizing relative velocity, by the control apparatus, between the capture head and the object, preparing the capture head to make contact with the object, making initial contact between the non-cooperative capture device and the object, activating the non-cooperative capture device, making initial contact between the non-cooperative capture device and the object, establishing intimate contact between the capture head and the object, and arresting the object motion. The control apparatus is able to move the object after the object motion has been arrested.

In accordance with a further embodiment of the present invention, an apparatus for non-cooperatively capturing an object in space is provided. The apparatus includes a boom. The boom includes a fixed end coupled to a structure, and a free end. The structure is a satellite, a space station, a space suited astronaut, or a spacecraft. The free end is able to move relative to the structure. The boom is expandable and retractable between the fixed and free end. The apparatus also includes a capture head, coupled to the free end of the boom, and a control apparatus for controlling movement of the capture head relative to the structure and engagement between the capture head and the object. The capture head also includes a non-cooperative capture device. The non-cooperative capture device includes one or more capture device pads utilizing a resettable adhesive to establish intimate contact between the capture head and the object. The control apparatus directs movement of the boom and capture head to move the capture head in proximity to the object, and determines if the capture head is close enough to the object to capture the object. The control apparatus moves the capture head in closer proximity to the object if the control apparatus determines the capture head is not close enough to the object to capture the object. The control apparatus minimizes relative velocity between the capture head and the object, and includes one or more articulated support members including one or more capture head actuators that control the position and orientation of the one or more articulated support members. The one or more articulated support members determine the position and orientation of the one or more non-cooperative capture device pads, and one or more sensors of the control apparatus determine the shape, topography, and/or texture of the object. In response, the control apparatus directs the capture head actuators to conform to the shape, topography, and/or texture of the object prior to the non-cooperative capture device making initial contact with the object. The non-cooperative capture device makes initial contact with the object, and activates a non-cooperative capture device in the capture head. The non-cooperative capture device establishes intimate contact between the capture head and the object, and the control apparatus arrests object motion. Finally, the control apparatus directs movement of the boom and capture head to move the object in space.

An advantage of the present invention is that it provides a method for capturing and controlling an unpredictably sized and shaped object. The object is not required to have any standard attachment points. This allows the present invention to be used for recovering objects smaller than or larger than the capture head size. Also, objects having rough, smooth, or complex shapes may be recovered, including non man-made objects including space debris or asteroids.

Yet another advantage of the present invention is it provides the ability to recover objects faster than with mechanical grippers. The present invention does not depend on the same degree of fine control as many types of mechanical grippers. All that is required is positioning a non-cooperative capture device in close enough proximity to an object being recovered such that activating the non-cooperative capture device will bring the non-cooperative capture device into contact with the object. Depending on the degree of fine control associated with a mechanical gripper, it may take many attempts to recover an object, and each attempt may take a long period of time if fine control motions are performed at a relatively slow speed.

A further advantage of the present invention is minimizing damage to sensitive outer coverings or electronics on recoverable payloads. Many existing spacecraft, satellites, and space stations are covered in Multi-Layer Insulation (MLI). MLI is relatively fragile, and easily damaged by mechanical grippers. The present invention utilizes low force per unit area in the capture process, reducing the likelihood of damaging fragile MLI or sensitive electronics.

Additional features and advantages of embodiments of the present invention will become more readily apparent from the following description, particularly when taken together with the accompanying drawings.

BRIEF DESCRIPTION OF THE DRAWINGS

FIG. 1a is a diagram illustrating a single segment sticky boom in accordance with embodiments of the present invention.

FIG. 1b is a diagram illustrating a multiple segment sticky boom in accordance with embodiments of the present invention.

FIG. 2a is a diagram illustrating a single segment extendable/retractable sticky boom in accordance with embodiments of the present invention.

FIG. 2b is a diagram illustrating a multiple segment extendable/retractable sticky boom in accordance with embodiments of the present invention.

FIG. 3a is an illustration depicting a rear oblique view of a general-purpose capture head in accordance with embodiments of the present invention.

FIG. 3b is an illustration depicting a rear view of a general-purpose capture head in accordance with embodiments of the present invention.

FIG. 3c is an illustration depicting a general purpose non-cooperative capture device in accordance with embodiments of the present invention.

FIG. 4a is an illustration depicting a rear oblique view of an axisymmetric capture head in accordance with embodiments of the present invention.

FIG. 4b is an illustration depicting a rear view of an axisymmetric capture head in accordance with embodiments of the present invention.

FIG. 4c is an illustration depicting an axisymmetric non-cooperative capture device in accordance with embodiments of the present invention.

FIG. 5 is a block diagram illustrating capture head components in accordance with embodiments of the present invention.

FIG. 6a is a block diagram illustrating a first embodiment of a capture head controller in accordance with the present invention.

FIG. 6b is a block diagram illustrating a second embodiment of a capture head controller in accordance with the present invention.

FIG. 6c is a block diagram illustrating a third embodiment of a capture head controller in accordance with the present invention.

FIG. 6d is a block diagram illustrating a fourth embodiment of a capture head controller in accordance with the present invention.

FIG. 7 is a block diagram illustrating a capture head control module in accordance with embodiments the present invention.

FIG. 8a is a block diagram illustrating a control apparatus in accordance with a first embodiment of the present invention.

FIG. 8b is a block diagram illustrating a control apparatus in accordance with a second embodiment of the present invention.

FIG. 9 is a flowchart illustrating an object capture process with a simple capture head in accordance with a first embodiment of the present invention.

FIG. 10 is a flowchart illustrating an object capture passive process in accordance with a second embodiment of the present invention.

FIG. 11 is a flowchart illustrating an object capture active process in accordance with a third embodiment of the present invention.

DETAILED DESCRIPTION

Robotic arms have been used for many tasks involving capture and moving objects. Typically, robotic arms are terminated in mechanical hands or grippers designed to emulate grasping motions associated with human hands or mechanical tools—such as pliers or certain types of wrenches. Mechanical grippers are suitable for capturing many types of payloads, where the payload is within the mechanical specifications of the mechanical grippers, and able to not be damaged by the mechanical grippers.

One such specification for a mechanical gripper is the amount by which the gripper may fully open. Related to this are angular relationships between each of the gripper elements, or fingers. These specifications will largely determine the maximum size of the payload which may be captured, or the size and orientation of an attachment point on the payload that the gripper may capture.

Another such specification is the number and flexibility of gripping services provided by the mechanical gripper. For example, simple grippers may have a fixed finger in conjunction with an actuated finger, where the actuated finger is able to open and close relative to the fixed finger. And other gripper may have two actuated fingers that oppose each other, where each of the actuated fingers is able to open and close relative to the other finger. More complex grippers may have three or more actuated fingers that oppose each other. Furthermore, each finger may have multiple articulation points such as joints or knuckles as present in human fingers. Although more complex grippers may be capable of capture a greater variety of payloads and/or attachment points, the additional complexity comes at the expense of higher cost, weight, training, and lower reliability due to higher mechanical and control software complexity.

Yet another such specification for a mechanical gripper is the type of gripping surface provided on the fingers of the gripper. For example, a ridged surface such as provided on the jaws of pliers may provide a more secure purchase on payloads and/or attachment points, but at the expense of potentially damaging more fragile payloads. As another example, a rough surface such used by course sandpaper or a smooth surface may be provided. Depending on the payload, a more course surface or a smooth surface may be preferred.

Finally, a mechanical gripper is ultimately controlled by a control system utilizing autonomous or human control. Depending on the design of the mechanical gripper control system, fine control of gripper position and gripper manipulation may be difficult if not impossible. This may result in very lengthy payload recovery operations, perhaps increasing cost and likelihood of damage to the payload.

Referring now to FIG. 1a, a diagram illustrating a single segment sticky boom in accordance with embodiments of the present invention is shown. The sticky boom is generally configured as a boom 104, with a boom fixed end 112a attached to a fixed surface 100, or structure, and an opposite boom free end 112b free to move. An object 124 is captured and recovered by the sticky boom. In one embodiment, the sticky boom moves the object 124 in a predetermined direction. In another embodiment, the sticky boom attaches a structure to the object 124 so that other booms 104, machines, or human operators may grab or move the object 124 at a later time.

The sticky boom has a fixed end 112a and a free end 112b. The boom fixed end 112a is coupled to a fixed surface 100. The fixed surface 100 provides a relative reference point for the boom free end 112b. In one embodiment, the fixed surface 100 is an exterior surface of a spacecraft or satellite. In another embodiment, the fixed surface 100 is an exterior surface of a terrestrial or space vehicle, or a space station. In yet another embodiment, the fixed surface 100 is a surface of a spacesuit or apparatus coupled to a spacesuit and controlled by an astronaut or human operator in the spacesuit. It should be noted that embodiments of the sticky boom are suitable for use in either terrestrial or space applications.

The sticky boom includes one or more boom deployers 108. The boom deployer 108 includes one or more boom actuators 144 that move the boom 104 in some fashion. In one embodiment, the boom deployer 108 controls boom actuators 144 at the boom free end 112b. In another embodiment, the boom deployer 108 controls boom actuators 144 at the boom fixed end 112a. In yet another embodiment, the boom deployer 108 controls boom actuators 144 at both the boom fixed end 112a and the boom free end 112b. The boom deployer 108 may optionally include one or more sensors 132 to provide feedback on boom 104 position, object 124 position, boom 104 forces, or boom actuator 144 state within boom deployer 108. Sensors 132 may also be capable of performing detailed surface mapping of the object 124, in order to increase the likelihood of successful object 124 capture by the sticky boom.

The sticky boom also includes a capture head 116. The capture head 116 is coupled to the boom free end 112b, and provides the support structures and capture apparatuses for capturing the object 124. The coupling between the capture head 116 and boom free end 112b may be a fixed coupling that maintains consistent orientation between the capture head 116 in the boom free end 112b. The coupling may also be an articulated coupling providing some degree of motion between capture head 116 and boom free end 112b. Articulated couplings include rotational couplings, hinges, swivels, gimbals, and any other type of mechanical coupling capable of providing predictable movement of the capture head 116 relative to the boom free end 112b. Articulated couplings may also use one or more springs to passively control movement between the capture head 116 and the boom free end 112b. In some embodiments, the articulated couplings include electromechanical devices such as step motors, solenoids, or servos to control capture head 116 movement remotely.

In some embodiments, the coupling between the capture head 116 and boom free end 112b provides temporary or permanent separation between the capture head 116 and the boom free end 112b. This may be useful in applications where it is desirable to provide a predictable attachment point on an object 124 not having predictable attachment points. A capture head 116 used as a predictable attachment point may allow a mechanical gripper or another boom 104 to capture and move the object 124 at a later time.

The capture head 116 includes a non-cooperative capture device 120. The non-cooperative capture device 120 is used in conjunction with the recovery process steps illustrated in FIGS. 9-11 to attach, capture, and move object 124. Examples of the non-cooperative capture device 120 of the present invention are illustrated and described in more detail in FIGS. 3 and 4.

The sticky boom includes a control apparatus 128. The control apparatus 128 controls the position, orientation, and operation of the sticky boom. Specifically, the control apparatus 128 controls one or more boom deployers 108, the capture head 116 and the non-cooperative capture device 120. In the preferred embodiment of the present invention, the control apparatus 128 is associated with the fixed surface 100, and includes controls, indicators, displays, and other user interface elements to allow a human operator to control the sticky boom. In alternate embodiments, the control apparatus operates totally autonomously under computer control, or remotely using telerobotic control. The control apparatus 128 also includes one or more sensors 132 to provide current information regarding object 124 and capture head 116 size, velocity, shape, and/or texture. Sensors 132 may include one or more cameras, radar devices, LIDAR, or optical devices. In some embodiments, the control apparatus 128 is associated with the fixed surface 100, and includes one or more computers and associated software to receive sensor 132 inputs and in response control boom deployers 108 and the capture head 116. In yet other embodiments, the control apparatus 128 is associated with the boom 104 and/or capture head 116 and includes one or more computers and associated software within the sticky boom to receive sensor 132 inputs, and in response, control boom deployers 108 and the capture head 116. In such an embodiment, a computer or human operator associated with the fixed surface 100 may direct the sticky boom to recover an object 124. Computers, sensors 132, and software in the sticky boom may then control the boom deployers 108 and capture head 116 to capture the object 124.

Object 124 may be stationary, or alternatively, may be in motion. If object 124 is in motion, then object 124 has object velocity 140. Object velocity 140 has a speed component and a direction component. As part of the non-cooperative capture processes of FIGS. 9-11, it is necessary to move the capture head 116 into proximity with the object 124 in order to capture the object 124. Since object 124 has object velocity 140, it is necessary during the capture process to match capture head velocity 136 to object velocity 140.

Referring now to FIG. 1b, a diagram illustrating a multiple segment sticky boom in accordance with embodiments of the present invention is shown. The multiple segment sticky boom includes a plurality of boom 104 segments, including at least boom segment 104a and boom segment 104b. In other embodiments, the multiple segment sticky boom has more than two boom segments 104. Each boom segment 104 includes a boom deployer 108, with boom deployer 108a in boom segment 104a and boom deployer 108b in boom segment 104b. Although not shown in FIG. 1b or later figures, it should be understood that all boom deployers 108 has associated with it one or more boom actuators 144. Each boom segment 104 is able to move independently of any other boom segment 104.

Each boom segment 104 is coupled to a fixed surface 100, another boom segment 104, or a capture head 116. Each of the couplings may be the same or a different type, as described with respect to FIG. 1a. In some embodiments, the couplings provide a similar degree of articulation as another form of robotic arm, or even a human arm (e.g. shoulder, elbow, wrist).

Referring now to FIG. 2a, a diagram illustrating a single segment extendable/retractable sticky boom in accordance with embodiments of the present invention is shown. The single segment extendable/retractable sticky boom in one embodiment includes two or more fixed length boom segments 204, where each boom segment 204 has a different diameter—allowing boom segments 204 to collapse within the length of the longest boom segment 204. Such an arrangement provides the ability to telescope between a minimum length corresponding to the longest boom segment 204, and a maximum length corresponding to the sum of the boom segment lengths 204. In the illustration of FIG. 2a, boom 104 includes three boom segments: boom segment 1-1 204a, boom segment 1-2 204b, and boom segment 1-3 204c.

In some embodiments, individual boom segments 204 may have limited degrees of freedom relative to other boom segments 204 in the same boom 104. For example, in the case of telescoping boom segments 204, boom segment 1-2 204b may rotate relative to boom segment 1-1 204a on the same axis. Additionally, boom segment 1-3 204c may rotate relative to boom segment 1-2 204b on the same axis. In other embodiments, the boom 104 may be extendable or retractable without requiring telescoping boom segments 204.

Referring now to FIG. 2b, a diagram illustrating a multiple segment extendable/retractable sticky boom in accordance with embodiments of the present invention is shown. The multiple segment extendable/retractable sticky boom is similar to the single segment extendable/retractable sticky boom of FIG. 2a. However, the multiple segment extended/retractable sticky boom of FIG. 2b has three boom segments 204, 208, 212 instead of the single boom segment 204 of FIG. 2a. Boom segment 204 includes boom segment 1-1 204a, boom segment 1-2 204b, and boom segment 1-3 204c. Boom segment 208 includes boom segment 2-1 208a, boom segment 2-2 208b, and boom segment 2-3 208c. Boom segment 212 includes boom segment 3-1 212a, boom segment 3-2 212b, and boom segment 3-3 212c.

Such a structure as illustrated in FIG. 2b allows each boom segment 204, 208, 212 to have an independent and variable length. This flexibility permits the capture head 116 to be moved into a position where object 124 may be more easily captured. As with FIG. 2a, the boom 104 may be extendable or retractable without requiring telescoping boom segments 204, 208, 212. Similarly, boom segments may be utilized that require only a single boom deployer 108 per boom segment 204, 208, 212, or multiple boom deployers 108 per boom segment 204, 208, 212.

Although various booms 104 are illustrated in FIGS. 1 and 2, the present invention applies as well to booms 104 where the boom fixed end 112a and/or boom free and 112b are able to be moved or relocated to another point on the fixed surface 100 in order to relocate the sticky boom.

Referring now to FIG. 3a, an illustration depicting a rear oblique view of a general-purpose capture head 116 in accordance with embodiments of the present invention is shown. The general-purpose capture head 116 includes mechanical elements that provide articulation and support for a non-cooperative capture device 120. In some embodiments, the mechanical elements are not externally controlled and are able to independently move when the capture head 116 makes contact with an object 124. Simple hinges, sometimes in cooperation with springs, allow independent movement for portions of the non-cooperative capture device 120, as illustrated in FIG. 3c. In other embodiments, the mechanical elements are externally controlled and move using solenoids, motors, or other forms of capture head actuators in response to stimulus from a human operator or computer. The embodiment illustrated in FIG. 3 is representative of the former embodiment, while the embodiment illustrated in FIG. 4 is representative of the latter embodiment.

The general-purpose capture head 116 includes a capture head support axis 304 incorporated within a coupling to the boom free end 112b. The capture head support axis 304 provides mechanical and electrical connections to the boom 104. For example, the capture head support axis 304 may include one or more articulated or non-articulated connections to the boom free end 112b. Electrical connections may include power, sensor inputs 132 from the capture head 116 to the boom 104, sensor inputs 132 from the boom 104 to the capture head 116, control signals from the capture head 116 to the boom 104, and control signals from the boom 104 to the capture head 116.

The general-purpose capture head 116 includes a capture head main support member 308 which provides main support between the capture head support axis 304 and three capture head second support members 312. In the preferred embodiment, the capture head main support member 308 has a rigid connection to the capture head support axis 304 and a pivoting or hinging connection to each of three capture head second support members 312.

Each of three capture head second support members 312 at one end connect to a capture head third support member 316, and at the other end connect to a capture head fifth support member 324. In the preferred embodiment, the capture head second support members 312 have a pivoting or hinged connection to the capture head third support members 316 and the capture head fifth support members 324.

Each of three capture head third support members 316 at one end connect to a capture head fourth support member 320, and at the other end connect to a non-cooperative capture device rear pad surface 332. In the preferred embodiment, the capture head third support members 316 have a pivoting connection to the capture head fourth support members 320 and the non-cooperative capture device rear pad surfaces 332.

Each of three capture head fourth support members 320 at each end connect to a different non-cooperative capture device rear pad surface 332. In the preferred embodiment, the capture head fourth support members 320 have a pivoting or hinged connection to each of the non-cooperative capture device rear pad surfaces 332.

Each of three capture head fifth support members 324 at each end connect to a different non-cooperative capture device rear pad surface 332. In the preferred embodiment, the capture head fifth support members 320 have a pivoting or hinged connection to each of the non-cooperative capture device rear pad surfaces 332.

Each of three capture head sixth support members 328 at one end connect to a capture head fifth support member 324, and at the other end connect to a non-cooperative capture device rear pad surface 332. In the preferred embodiment, the capture head sixth support members 328 have a pivoting or hinged connection to each of the capture head fifth support members 324 and the non-cooperative capture device rear pad surfaces 332.

The support members 316, 320, 324, and 328 for general-purpose capture head 116 are oriented in order to provide a connection 340 to each of 18 non-cooperative capture device rear pad surfaces 332. In a preferred embodiment, the connections 340 are center-loaded. However, in other embodiments the connections 340 are edge-loaded or have some other form of loading. In other embodiments, there may be fewer than 18 or more than 18 non-cooperative capture device rear pad surfaces 332. Each of the connections 340 may optionally provide power and control signals to the non-cooperative capture device rear pad surfaces 332, and may possibly receive various sensor inputs from the non-cooperative capture device rear pad surfaces 332.

The front surface of the non-cooperative capture device 120 of FIG. 3c includes 18 non-cooperative capture device pads 344. Each of the non-cooperative capture device pads 344 includes a non-cooperative capture device conformal surface 336, which provides a resilient surface that makes direct contact with the object 124 during the capture process illustrated in FIG. 9-11. The non-cooperative capture device conformal surface 336 also provides either resettable or non-resettable adhesion for the non-cooperative capture device 120. Resettable adhesives provide an adhesion property which may be activated or inactivated under control of the control apparatus 128. Examples of resettable adhesives include, but are not limited to, electrostatic attraction, gecko adhesion, electromagnets, and some forms of Velcro. Examples of non-resettable adhesives include, but are not limited to, glues, other forms of Velcro, low-temperature alloys or solder compounds, and permanent magnets. Non-resettable adhesives such as provide an adhesion property which may be only activated, but not inactivated, under control of the control apparatus 128, by moving the non-cooperative capture device 120 into contact with the object 124.

Referring now to FIG. 3b, an illustration depicting a rear view of a general-purpose capture head 116 in accordance with embodiments of the present invention is shown. FIG. 3b includes the same elements shown in FIG. 3a, but provides a view more clearly illustrating connections to each of the non-cooperative capture device rear pad surfaces 332.

In a preferred embodiment, each of the pivots or hinges of each of the capture head support members 308, 312, 316, 320, 324, and 328 includes a brake device 348. The brake devices 348 are controlled by control apparatus 128. When inactivated, brake devices 348 allow each pivot or hinge to move within the allowed range of the pivot or hinge, subject to the influence of external forces, including contact with an object 124 or forces imposed by springs attached to support members 308, 312, 316, 320, 324, and 328. When activated, brake devices 348 provide a locking torque to each of the pivots or hinges in the current position each pivot or hinge is in, and prevent movement by any hinged pair of capture head support members 308, 312, 316, 320, 324, and 328.

Referring now to FIG. 3c, an illustration depicting a general-purpose non-cooperative capture device 120 in accordance with embodiments of the present invention is shown. The general-purpose non-cooperative capture device 120 forms the front surface of the capture head 116, and provides the surfaces that make contact with and capture the object 124. In the embodiment illustrated in FIG. 3c, 18 pads 344 are provided and coupled to support members 316, 320, 324, and 328 of capture head 116 through capture head support attachments 340. Each pad 344 includes a non cooperative capture device rear pad surface 332 and a non-cooperative capture device conformal surface 336. Capture head support attachments 340 may be any rigid attachment between the pads 344 and support members 316, 320, 324, and 328, including rivets, screws, glue, or any other suitable attachment method.

Each of the pads 344 has a non-cooperative capture device conformal surface 336. The non-cooperative capture device conformal surface 336 is on the front surface of each pad 344, and is resiliently configured to conform to the shape, topography, and/or texture of the portion of object 124 in contact with each of the non-cooperative capture device conformal surfaces 336.

Instead of a mechanical grabber, the general-purpose non-cooperative capture device 120 utilizes one of several technologies to capture and control the object 124. In a preferred embodiment, electrostatic attraction is utilized in the pads, and a resilient material forms the non-cooperative capture device conformal surface 336. In another embodiment, gecko adhesion technology is utilized. In yet another embodiment, Velcro technology is utilized. In yet another embodiment, glue is utilized. In a further embodiment, a low-temperature melt alloy is used. In a final embodiment, magnets or electromagnets are used.

Electrostatic attraction and gecko adhesion technologies are preferred due to strength of capture force, resettability, and the ability to provide variable adhesion force on different pads or even areas of the same pad. However, Velcro and permanent magnets are not preferred due to difficulty associated with letting go of a captured object 124, and glues and possibly low-temperature melt alloys are not preferred due to loss of adhesion properties with continued use.

Referring now to FIG. 4a, an illustration depicting a rear oblique view of an axisymmetric capture head 116 in accordance with embodiments of the present invention is shown. The axisymmetric capture head 116 provides a simpler mechanical support structure than the general-purpose capture head 116 of FIG. 3. In the axisymmetric capture head 116 embodiment illustrated, four sets of pads are used. The embodiment illustrated in FIG. 4 is generally representative of embodiments where the mechanical elements are externally controlled by control apparatus 128 and move using solenoids, motors, or other forms of capture head actuators in response to stimulus from a human operator or computer.

The axisymmetric capture head 116 includes a capture head coupling 404, which attaches to the boom free end 112b. The capture head coupling 404 includes comparable mechanical and electrical functionality as the capture head support axis 304 described with reference to FIG. 3a.

The support structure for the axisymmetric capture head 116 is simpler than the general-purpose capture head 116, and includes two types of support members instead of six. The axisymmetric capture head 116 includes a capture head main support member 408, which attaches to the capture head coupling 404 and each of four capture head second support members 412. A rigid attachment is provided to the capture head coupling 404 and a pivoting attachment is provided to each of the four capture head second support members 412.

Each of four capture head second support members 412 is pivotally attached to the capture head main support member 408. One end of each capture head second support member 412 is attached to a capture head minor non-cooperative capture device rear surface 420, and the other end of each capture head second support member 412 is attached to a capture head major non-cooperative capture device rear surface 416.

The support members 408, 412 for the axisymmetric capture head 116 are oriented in order to provide a connection to each of 8 major non-cooperative capture device rear surfaces 416 and 8 minor non-cooperative capture device rear surfaces 420. In other embodiments, there may be fewer than 8 or more than 8 non-cooperative capture device rear surfaces 416, 420. Each of the connections may optionally provide power and control signals to the non-cooperative capture device rear surfaces 416, 420, and may possibly receive various sensor inputs from the non-cooperative capture device rear surfaces 416, 420.

Referring now to FIG. 4b, an illustration depicting a rear view of an axisymmetric capture head 116 in accordance with embodiments of the present invention is shown. FIG. 4b includes the same elements shown in FIG. 4a, but provides a view more clearly illustrating connections to each of the non-cooperative capture device rear surfaces 416, 420.

The axisymmetric capture head 116 includes capture head actuators 444 at each pivot or hinge connection. The capture head actuators 444 are individually controlled by the control apparatus 128, and in the preferred embodiment of FIG. 11 are pre-loaded by the control apparatus 128 in response to sensor 132 inputs in order to conform to the shape, topography, and/or texture of the object 124 prior to making initial contact between the non-cooperative capture device 120 and the object 124.

In a preferred embodiment, the capture head major support attachments 432 and capture head minor support attachments 436 are center-loaded. However, in other embodiments the attachments 432, 436 are edge-loaded or have some other form of loading.

Referring now to FIG. 4c, an illustration depicting an axisymmetric non-cooperative capture device 120 in accordance with embodiments of the present invention is shown. The axisymmetric non-cooperative capture device 120 forms the front surface of the axisymmetric capture head 116, and provides the surfaces that make contact with, and capture, the object 124. In the embodiment illustrated in FIG. 4c, eight pads 440 are provided and coupled to support members 408, 412 of axisymmetric capture head 116 through capture head major support attachments 432 and capture head minor support attachments 436. Each major pad 440 includes a major non cooperative capture device rear surface 416 and a major non-cooperative capture device conformal surface 424. Each minor pad 440 includes a minor non cooperative capture device rear surface 420 and a minor non-cooperative capture device conformal surface 428. The axisymmetric non-cooperative capture device 120 has a pad orientation of larger major pads 440 toward the outside and smaller minor pads 440 on the inside. However, other arrangements with fewer or more pads 440, or smaller or larger pads 440, may be utilized without deviating from the present invention.

Capture head major support attachments 432 and capture head minor support attachments 436 may be any rigid attachment between the pads 440 and support members 408, 412, including rivets, screws, glue, or any other suitable attachment method.

Instead of a mechanical grabber, the axisymmetric non-cooperative capture device 120 utilizes one of several technologies to capture and control the object 124. In a preferred embodiment, a resettable adhesive technology is utilized, and a resilient material forms the non-cooperative capture device conformal surfaces 424, 428. In another embodiment, a non-resettable adhesive adhesion technology is utilized.

Electrostatic attraction and gecko adhesion technologies are preferred due to strength of capture force, resettability, and the ability to provide variable adhesion force on different pads 440 or even areas of the same pad 440. However, Velcro and permanent magnets are not preferred due to difficulty associated with letting go of a captured object 124, and glues and possibly low-temperature melt alloys are not preferred due to loss of adhesion properties with continued use. In the preferred embodiment, each of the conformal surfaces 424, 428 includes a resettable adhesive on each pad 448.

The examples provided in FIGS. 3 and 4 should be understood to only be examples of certain types of non-cooperative capture devices 120, and do not limit the scope of the invention. Therefore, the capture head 116 and non-cooperative capture device 120 may have any combination or presence/absence of fixed or articulated capture heads, springs, number of pads, resettable or non-resettable adhesives, sensors, brakes, actuators, springs, and materials.

Referring now to FIG. 5, a block diagram illustrating components of a capture head 116 in accordance with embodiments of the present invention is shown.

Capture head 116 includes one or more capture head actuators 444. Actuators 444 include motors, servos, solenoids, and other forms of electromechanical devices able to move structural support members 308, 312, 316, 320, 324, 328, 408, or 412. The actuators 444 are able to modify the pad 344, 440 shape and orientation of non-cooperative capture device 120 to better conform to the shape of object 124.

Capture head 116 also includes a conformal surface for non-cooperative capture device 512. The conformal surface for non-cooperative capture device 512 includes non-cooperative capture device conformal surface 336, major non-cooperative capture device conformal surface 424, and minor non-cooperative capture device conformal surface 428. In embodiments utilizing electrostatic attraction or gecko adhesion technologies, adhesion properties of the conformal surface are controlled by control apparatus 128.

Capture head 116 also includes a capture head controller 516. Capture head controller 516 in some embodiments controls actuators for non-cooperative capture device 444 and conformal surface for non-cooperative capture device 512, and receives inputs from both. For example, actuators for non-cooperative capture device 444 may provide servo feedback signals that capture head controller 516 receives in order to determine the position of each individual actuator 444. Similarly, capture head controller 516 is able to receive force feedback from conformal surface for non-cooperative capture device 512, in order to determine if the object 124 is securely captured.

In an optional embodiment, capture head 116 includes an actuator for the boom free end 504. Actuator 504 allows the capture head 116 to move or pivot in relation to the boom free end 112b. An actuator 504 would not be present in sticky boom configurations having a rigidly attached capture head 116 to boom 104, or configurations where the capture head 116 was movable and actuators 504 were instead included in the boom free end 112b.

Capture head 116 may also contain in optional embodiments one or more positional sensors 520. Positional sensors 520 include cameras, radar devices, optical sensors, lasers, and other devices. Positional sensors 520 provide feedback to capture head controller 516 from which the position and orientation of capture head 116 relative to the object 124 and the fixed surface 100 may be determined. In other embodiments, position sensors 520 are not present in capture head 116, and are instead present in one or more portions of boom 104 or fixed surface 100, such as sensors 132.

Referring now to FIG. 6a, a block diagram illustrating a first embodiment of a capture head controller 516 in accordance with the present invention is shown. The embodiment of FIG. 6a is a simple embodiment whereby the capture head 116 includes no or limited inherent processing resources or other computer intelligence of its own, and depends on resources provided through the boom 104.

Capture head controller 516 includes a boom free end coupling 604. The boom free end coupling 604 provides mechanical and electrical connection between the boom free end 112b in the capture head 116.

The boom free end coupling 604 passes through power 608 from the boom 104 to the capture head 116 and the non-cooperative capture device 120. Power 608 is used by actuators, sensors, and any electrical needs of the non-cooperative capture device 120, including conformal surface control. Power 608 may include various DC voltages, DC ground, AC voltages, and AC ground, depending on power needs. In some embodiments, power 608 is not provided through the boom 104, and is instead provided from one or more power sources on the capture head 116, including but not limited to solar cells, batteries, fuel cells, electromagnetic energy harvesting, or nuclear power sources.

The boom free end coupling 604 passes through boom free end actuator control/feedback signals 612. The boom free end actuator control/feedback signals 612 are optional, depending on whether the control head 116 is movable relative to the boom free end 112b. If the control head 116 is movable relative to the boom free end 112b, if the actuators controlling movement are in the control head 116, boom free end actuator control/feedback 612 controls such actuators. If instead the actuators controlling movement are in the boom free end 112b, then boom free end actuator control/feedback 612 would not be present.

Boom free end coupling 604 also passes through actuator control/feedback for capture head 616. The number of actuator control signals 616 provided depends on the number and presence of actuators 444 in the capture head 116. Capture head actuators 444 control capture head support members including support members 312, 316, 320, 324, 328, 408, and 412. Control signals 616 include those signals required to cause each actuator 444 to move in each supported direction, including rotation, directional movement, extending/retracting, and any other sort of movement. In some embodiments, actuators 444 provide feedback signals 616 to indicate the degree to which an actuator has moved. For example, step motors and servos sometimes supply signals indicating angular or other position information. Control apparatus 128 utilizes feedback signals 616 to accurately determine capture head 116 position and orientation relative to the object 124. Feedback signals 612 may also include capture head 116 camera or other sensor signals.

Boom free end coupling 604 also passes through conformal surface control/feedback for non-cooperative capture device 620. Control signals for the non-cooperative capture device 620 include voltages or control signals for non-cooperative capture devices 120 utilizing resettable adhesive technology. Depending on the number of control signals 620 required to control the non-cooperative capture device 120, conformal surface control/feedback for non-cooperative capture device 620 may utilize various forms of multiplexing including serial to parallel data conversion in the boom free end coupling 604. Multiplexing may be used with any and all other control or feedback signals between the boom 104 or fixed surface 100 and capture head 116. It is recognized that some non-cooperative capture devices 120 may provide force or position feedback signals 620 which the control apparatus 128 will use to make fine adjustments in conformal surface control signals 620 when capturing the object 124.

Referring now to FIG. 6b, a block diagram illustrating a second embodiment of a capture head controller 516 in accordance with the present invention is shown. The embodiment illustrated in FIG. 6b provides a limited or great amount of computer intelligence within the capture head 116. The advantage of such an embodiment is reducing communication load between the fixed surface 100 and capture head 116, and processing required by the control apparatus 128, by offloading many low-level processing tasks.

The capture head controller 516 includes a boom free end coupling 604. The boom free end coupling 604 provides power 608 to a capture head control module 624, and other electrical assemblies in the capture head 116. The other electrical assemblies in the capture head 116 include actuators, cameras, sensors, and the non-cooperative capture device 120. In some embodiments, power 608 is not provided through boom 104 and boom free end coupling 604, but is instead provided from one or more local power sources on the capture head 116, as previously described.

The boom free and coupling 604 provides commands 628 to the capture head control module 624. In a preferred embodiment, the commands 628 are transferred between the boom free end coupling 604 in the capture head control module 624 over a high-speed serial bus, including MIL-STD-1553, RS-422, or Ethernet. Commands 628 include high-level commands such as make initial contact between non-cooperative capture device 120 and the object 124, or move captured object 124 to a specific location.

In some embodiments, the boom free end coupling 604 receives feedback 632 from the capture head control module 624, and passes the feedback data through the boom 104. Feedback 632 includes macro-level feedback such as non-cooperative capture device 120 made initial contact with the object 124, non-cooperative capture device 120 is in intimate contact with the object 124, or the capture head 116 is close enough to the object 124 to capture the object 124.

The capture head control module 624 controls actuators 444 within the control head 116 and the non-cooperative capture device 120, and receives feedback from actuators, cameras, and sensors. Actuator control/feedback for capture head 616, boom free end actuator control/feedback 612, and conformal surface control/feedback for non-cooperative capture device 620 were discussed relative to FIG. 6a.

In some embodiments, the capture head control module 624 receives object and position sense data 636. Object and position sense data 636 is data from various position sensors that may be present on the control head 116. Object and position sensors include magnetic sensors, optical sensors, radiation sensors, and radio wave sensors.

Referring now to FIG. 6c, a block diagram illustrating a third embodiment of a capture head controller 516 in accordance with the present invention is shown. The embodiment illustrated in FIG. 6c is similar to the embodiment illustrated in FIG. 6a, but utilizes wireless communication technology to communicate between the capture head 116 and the fixed surface 100. The advantage of such an embodiment is reducing cabling and connector complexity throughout the boom 104, including the boom free end coupling 604.

The boom free end coupling 604 provides power 608 to a capture head wireless transceiver 640 and to other electrical assemblies in the capture head 116. In some embodiments, power 608 is not provided through boom 104 and boom free end coupling 604, but is instead provided from one or more local power sources in the capture head 116, as previously described.

All control and feedback data in FIG. 6c passes through a capture head wireless transceiver 640. The capture head wireless transceiver 640 utilizes any suitable wireless communication technology, including optical data transfer, microwaves, or other forms radiated data transmission and reception. The capture head wireless transceiver 640 in one embodiment receives power 608 through boom free end coupling 604, and in other embodiments receives power 608 from one or more local power sources in capture head 116, as previously described.

Actuator control/feedback for capture head 616, boom free end actuator control/feedback 612, and conformal surface control/feedback for non-cooperative capture device 620 were discussed relative to FIG. 6a.

Referring now to FIG. 6d, a block diagram illustrating a fourth embodiment of a capture head controller 516 in accordance with the present invention is shown. The embodiment illustrated in FIG. 6d is similar to the embodiment illustrated in FIG. 6b, but utilizes wireless communication technology to communicate between the capture head 116 and the fixed surface 100. The advantage of such an embodiment is reducing cabling and connector complexity throughout the boom 104, including the boom free end coupling 604.

The boom free end coupling 604 provides power 608 to a capture head wireless transceiver 640, a capture head control module 624, and to other electrical assemblies in the capture head 116. In some embodiments, power 608 is not provided through boom 104 and boom free end coupling 604, but is instead provided from one or more local power sources in the capture head 116, as previously described.

The other functionality illustrated in FIG. 6d was described with reference to FIGS. 6a-6c.

Referring now to FIG. 7, a block diagram illustrating a capture head control module 624 in accordance with embodiments the present invention is shown.

The capture head control module 624 includes a processor 704. The processor 704 executes stored programs to control micro operation of the capture head 116 and non-cooperative capture device 120. In a preferred embodiment, processor 704 is a low-power embedded processor such as a processor from the ARM, PowerPC, X86, or RISC processor families.

Processor 704 communicates with memory 708. Memory 708 may include any combination of volatile and non-volatile memories, and stores programs executed by processor 704. Memory 708 also provides temporary storage for feedback data from actuators, cameras, or sensors, and temporary storage required by processor 704. Memory 708 includes ROM, RAM, flash memory, SD memory, disk drives, and NV RAM. In some embodiments, the memory 708 and/or the processor 704 are battery backed in the event of power 608 loss.

Capture head control module 624 also includes capture head control/feedback interfaces 712. The capture head control/feedback interfaces 712 provides suitable interfaces between the processor 704 and the actuator control/feedback for capture head 616, boom free end actuator control/feedback 612, and conformal surface control/feedback for non-cooperative capture device 620. In a preferred embodiment, capture head control/feedback interfaces 712 interfaces with the processor 704 using a high-speed serial communication bus such as MIL-STD-1553 bus, RS-422, Ethernet, USB, or FireWire.

Capture head control module 624 also includes spacecraft control/feedback interfaces 716, which provides commands 628 to the processor 704 and receives optional feedback 632 from the processor 704. The spacecraft control/feedback interfaces 716 interfaces with either the boom free end coupling 604 or the capture head wireless transceiver 640, as described with reference to FIGS. 6a-6d.

Referring now to FIG. 8a, a block diagram illustrating a control apparatus 128 in accordance with a first embodiment of the present invention is shown. In the first embodiment shown in FIG. 8a, most control information is provided to and received from the capture head 116 through the boom 104, as illustrated in FIGS. 6a and 6b.

Control apparatus 128 includes a boom fixed end coupling 808, which provides electrical connection between the fixed surface 100 and the boom 104. The boom fixed end coupling 808 receives power 608 from a power source associated with the fixed surface 100. However in other embodiments, power 608 is not provided through the boom fixed end coupling 808 and instead the capture head 116 and non-cooperative capture device 120 are powered through one or local power sources in capture head 116, as previously described. Local power sources include, but are not limited to, solar cells, nuclear power sources, fuel cells, and batteries.

Control apparatus 128 also includes a user interface 804, through which one or more human users control operation of the sticky boom. In a preferred embodiment, user interface 804 utilizes a graphical user interface for efficient communication with the human operators. User interface 804 generates commands 628 to the boom fixed end coupling 808, and in some cases receives feedback 632 from the boom fixed end coupling 808. The boom 104 conveys commands 628 and feedback 632 between the boom fixed end coupling 808 and the boom free end coupling 604.

In some embodiments, control apparatus 128 includes various sensors 132 associated with the fixed surface 100. Sensors 132 provide object and position sense data 636 to the user interface 804, allowing one or more human users to precisely control the capture head 116, non-cooperative capture device 120, and the object 124.

Referring now to FIG. 8b, a block diagram illustrating a control apparatus 128 in accordance with a second embodiment of the present invention is shown. In the second embodiment shown in FIG. 8b, most control information is provided to and received from the capture head 116 through the capture head wireless transceiver 640, as illustrated in FIGS. 6c and 6d.

Control apparatus 128 includes a boom fixed end coupling 808, which provides electrical connection between the fixed surface 100 and the boom 104. The boom fixed end coupling 808 receives power 608 from a power source associated with the fixed surface 100. However in other embodiments, power 608 is not provided through the boom fixed end coupling 808 and instead the capture head 116 and non-cooperative capture device 120 are powered through one or more local power sources in capture head 116, as previously described.

Control apparatus 128 also includes a user interface 804, through which one or more human users control operation of the sticky boom. In a preferred embodiment, user interface 804 utilizes a graphical user interface for efficient communication with the human operators. User interface 804 generates commands 628 to a control apparatus wireless transceiver 820, and in some cases receives feedback 632 from the control apparatus wireless transceiver 820. The control apparatus wireless transceiver 820 conveys commands 628 and feedback 632 between the fixed surface 100 and the capture head wireless transceiver 640.

In some embodiments, control apparatus 128 includes various sensors 132 associated with the fixed surface 100. Sensors 132 provide object and position sense data 636 to the user interface 804, allowing one or more human users or computers to precisely control the capture head 116, non-cooperative capture device 120, and the object 124.

Referring now to FIG. 9, a flowchart illustrating an object 124 capture process with a simple capture head 116 in accordance with a first embodiment of the present invention is shown. Flow begins at block 904.

At block 904, the control apparatus 128 moves a capture apparatus into proximity to the object 124. The capture apparatus includes a boom 104 and a capture head 116, where the capture head 116 includes a non-cooperative capture device 120. Proximity depends on the technology used for the non-cooperative capture device 120, based on the distance at which adhesive forces will be effective to initiate contact with the object 124.

In the case of electrostatic attraction technology, proximity depends on the number and strength of electrodes in the non-cooperative capture device 120 and the ability of the conformal surface of the non-cooperative capture device 336, 424, 428 to make intimate contact with the object 124 when the electrodes are energized.

In the case of gecko adhesion technology, proximity depends on the number, density, and configuration of nanofibrillar structures on the conformal surface of the non-cooperative capture device 336, 424, 428, and the ability of the nanofibrillar structures to make intimate contact with the object 124 when the conformal surface 336, 424, 428 is energized.

In the case of Velcro technology, proximity depends on the length of the Velcro nap and requires the Velcro nap to be barely touching the object 124. Initial contact in the case of Velcro then requires additional force to be exerted by the non-cooperative capture device 120 such that the conformal surface 336, 424, 428 is directly pushing against the object 124.

In the case of glue technology, proximity requires the glue to be barely touching the object 124. Initial contact in the case of glue then requires additional force to be exerted by the non-cooperative capture device 120 such that the conformal surface 336, 424, 428 is directly pushing against the object 124.

In the case of magnet or electromagnet technology, proximity requires sufficient distance between the non-cooperative capture device 120 and the object 124 in order for the non-cooperative capture device 120 to exert enough attraction force to cause the capture head 116 to move toward the object 124. Flow proceeds to decision block 908.

At decision block 908, the control apparatus 128 determines if the capture head 116 is close enough to the object 124 to capture the object 124. In the embodiments illustrated in FIGS. 6b and 6d, the capture head control module 624 instead of the control apparatus 128 may determine if the capture head 116 is close enough to the object 124 to capture the object 124. If the capture head 116 is close enough to the object 124 to capture the object 124 then flow proceeds to block 916. If the capture head 116 is not close enough to the object 124 to capture the object 124, flow instead proceeds to block 912.

At block 912, the control apparatus 128 (or capture head control module 624) moves the capture apparatus into closer proximity to the object 124. In some cases, it will be required to move the boom 104 in order to move the capture head 116 close enough to the object 124 to capture the object 124. In other cases, it will be required to move the capture head 116 relative to the boom 104 in order to move the capture head 116 close enough to the object 124 to capture the object 124. In yet other cases, it will be required to cause capture head actuators 444 in the capture head 116 itself to move in order to move the capture head 116 close enough to the object 124 to capture the object 124. Flow proceeds to decision block 908.

At block 916, the control apparatus 128 minimizes relative velocity between the capture head 116 and the object 124. It is important to minimize relative velocity between the capture head 116 and the object 124 in order to minimize relative forces between the capture head 116 and the object 124, and maximize the amount of time the non-cooperative capture device 120 is close to the object 124. At this time, the object 124 is not yet captured. Therefore, the boom 104 and capture head 116 are moved to match the current speed and direction of the object 124. Flow proceeds to blocks 920 and 924.

At block 920, the non-cooperative capture device 120 makes initial contact with the object 124. At this point, the conformal surface of the non-cooperative capture device 336, 424, 428 is exerting initial force against the object 124. Flow proceeds to block 928.

At block 924, the control apparatus 128 minimizes forces applied by the capture head 116 to the object 124. Forces are minimized in order to reduce the chance of the object 124 bouncing off the capture head 116 after initial contact is made. Sensors 132 in the capture head 116 can monitor the capture head 116 for forces imposed by the object 124. In response to the observed forces during initial contact, the control apparatus 128 provides commands to boom actuators 144, capture head actuators 444, and the capture head coupling 304, 404 to impart equal and opposite forces on the object 124. Such force feedback should be applied to the object 124 as fast as possible to minimize the chance of the object 124 bouncing off the capture head 116. Flow proceeds to block 928.

At block 928, the control apparatus 128 activates the non-cooperative capture device 120 in the capture head 116. In the case of electrostatic attraction and gecko adhesion technologies, activating the non-cooperative capture device 120 means energizing electrodes and/or nanofibrillar structures, respectively, in the non-cooperative capture device 120. In the case of Velcro, permanent magnets, and glues, activating the non-cooperative capture device 120 means slowly moving the conformal surface 336, 424, 428 toward the object 124. In the case of electromagnets, activating the non-cooperative capture device 120 means activating the electromagnet to induce attraction between the non-cooperative capture device 120 in the object 124. Flow proceeds to block 932.

At block 932, the non-cooperative capture device 120 establishes intimate contact with the object 124. With the non-cooperative capture device 120 activated, the conformal surface 336, 424, 428 continues to press against the object 124 and resiliently conforms to the object 124 shape, orientation, and/or texture. By resiliently conforming to the object 124 shape, orientation, and/or texture, the non-cooperative capture device 120 maximizes surface contact with the object 124 and thereby captures the object 124. Flow proceeds to block 936.

At block 936, the control apparatus 128 arrests the object 124 motion. Arresting the object 124 motion includes imparting forces through the boom 104 and capture head 116 to reduce the velocity of the object 124 such that the object 124 is moving at a desirable speed and direction, or not moving. Flow proceeds to blocks 940 and 944.

At block 940, the control apparatus 128 moves the object 124. The object 124 is able to be moved into a position relative to the fixed surface 100 based on the size, complexity, and flexibility of the boom 104 and capture head 116. Flow ends at block 940.

At block 944, the control apparatus 128 disengages the boom 104 from the capture head 116. The coupling between the boom 104 and the capture head 116 allows separation between the boom free end 112b and the capture head 116. Since the capture head 116 is rigidly captured to the object 124, the capture head 116 remains attached to the object 124 after the boom free end 112b is separated from the capture head 116. This then allows another boom 104 or other device to engage the capture head 116 at some time in the future. It should be noted that active electrical devices in the non-cooperative capture device 120 of the capture head 116 must continue to be activated after the boom 104 is separated from the capture head 116. Therefore, a power source suitable of powering the non-cooperative capture device 120 in the absence of power 608 from the boom 104 must be provided in the capture head 116, as previously discussed. Flow ends at block 944.

Referring now to FIG. 10, a flowchart illustrating an object 124 capture passive process in accordance with a second embodiment of the present invention is shown. Flow begins at block 1004.

At block 1004, the control apparatus 128 moves a capture apparatus into proximity to the object 124. The capture apparatus includes a boom 104 and a capture head 116, where the capture head 116 includes a non-cooperative capture device 120. Proximity depends on the technology used for the non-cooperative capture device 120, based on the distance at which adhesive forces will be effective to initiate contact with the object 124.

In the case of electrostatic attraction technology, proximity depends on the number and strength of electrodes in the non-cooperative capture device 120 and the ability of the conformal surface 336, 424, 428 to make intimate contact with the object 124 when the electrodes are energized.

In the case of gecko adhesion technology, proximity depends on the number, density, and configuration of nanofibrillar structures on the conformal surface of the non-cooperative capture device 336, 424, 428, and the ability of the nanofibrillar structures to make intimate contact with the object 124 when the conformal surface 336, 424, 428 is energized.

In the case of Velcro technology, proximity depends on the length of the Velcro nap and requires the Velcro nap to be barely touching the object 124. Initial contact in the case of Velcro then requires additional force to be exerted by the non-cooperative capture device 120 such that the conformal surface 336, 424, 428 is directly pushing against the object 124.

In the case of glue technology, proximity requires the glue to be barely touching the object 124. Initial contact in the case of glue then requires additional force to be exerted by the non-cooperative capture device 120 such that the conformal surface 336, 424, 428 is directly pushing against the object 124.

In the case of magnet or electromagnet technology, proximity requires sufficient distance between the non-cooperative capture device 120 and the object 124 in order for the non-cooperative capture device 120 to exert enough attraction force to cause the capture head 116 to move toward the object 124. Flow proceeds to decision block 1008.

At decision block 1008, the control apparatus 128 determines if the capture head 116 is close enough to the object 124 to capture the object 124. In the embodiments illustrated in FIGS. 6b and 6d, the capture head control module 624 instead of the control apparatus 128 may determine if the capture head 116 is close enough to the object 124 to capture the object 124. If the capture head 116 is close enough to the object 124 to capture the object 124 then flow proceeds to block 1016. If the capture head 116 is not close enough to the object 124 to capture the object 124, then flow instead proceeds to block 1012.

At block 1012, the control apparatus 128 (or capture head control module 624) moves the capture apparatus into closer proximity to the object 124. In some cases, it will be required to move the boom 104 in order to move the capture head 116 close enough to the object 124 to capture the object 124. In other cases, it will be required to move the capture head 116 relative to the boom 104 in order to move the capture head 116 close enough to the object 124 to capture the object 124. In yet other cases, it will be required to cause capture head actuators 444 in the capture head 116 itself to move in order to move the capture head 116 close enough to the object 124 to capture the object 124. Flow proceeds to decision block 1008.

At block 1016, the control apparatus 128 minimizes relative velocity between the capture head 116 and the object 124. It is important to minimize relative velocity between the capture head 116 and the object 124 in order to minimize relative forces between the capture head 116 and the object 124, and maximize the amount of time the non-cooperative capture device 120 is close to the object 124. At this time, the object 124 is not yet captured. Therefore, the boom 104 and capture head 116 are moved to match the current speed and direction of the object 124. Flow proceeds to block 1020.

At block 1020, the control apparatus 128 releases brakes 348 on capture head support members 308, 312, 316, 320, 324, and 328. Releasing brakes 348 on capture head support members 308, 312, 316, 320, 324, and 328 allows each of the non-cooperative capture device pads 344 to move freely within the movement capabilities of capture head support members 308, 312, 316, 320, 324, and 328. For example, hinged joints between any of capture head support members 308, 312, 316, 320, 324, and 328 allows free movement up to the limitations of each hinged joint. Flow proceeds to blocks 1024 and 1028.

At block 1024, the non-cooperative capture device 120 makes initial contact with the object 124. At this point, the conformal surface of the non-cooperative capture device 336, 424, 428 is exerting initial force against the object 124. Flow proceeds to block 1032.

At block 1028, the control apparatus 128 minimizes forces applied by the capture head 116 to the object 124. Forces are minimized in order to reduce the chance of the object 124 bouncing off the capture head 116 after initial contact is made. Sensors 132 in the capture head 116 can monitor the capture head 116 for forces imposed by the object 124. In response to the observed forces during initial contact, the control apparatus 128 provides commands to boom actuators 144, capture head actuators 444, and the capture head coupling 304, 404 to impart equal and opposite forces on the object 124. Such force feedback should be applied to the object 124 as fast as possible to minimize the chance of the object 124 bouncing off the capture head 116. Flow proceeds to block 1032.

At block 1032, the control apparatus 128 activates a non-cooperative capture device 120 in the capture head 116. In the case of electrostatic attraction and gecko adhesion technologies, activating the non-cooperative capture device 120 means energizing electrodes or nanofibrillar structures, respectively, in the non-cooperative capture device 120. In the case of Velcro, permanent magnets, and glues, activating the non-cooperative capture device 120 means slowly moving the conformal surface 336, 424, 428 toward the object 124. In the case of electromagnets, activating the noncooperative capture device 120 means energizing the electromagnets. Flow proceeds to block 1036.

At block 1036, the non-cooperative capture device 120 establishes intimate contact with the object 124. With the non-cooperative capture device 120 activated, the conformal surface 336, 424, 428 continues to press against the object 124 and resiliently conforms to the object 124 shape, orientation, and/or texture. By resiliently conforming to the object 124 shape, orientation, and/or texture, the non-cooperative capture device 120 maximizes surface contact with the object 124 and thereby captures the object 124. Flow proceeds to block 1040.

At block 1040, the control apparatus 128 activates brakes 348 on capture head support members 308, 312, 316, 320, 324, and 328. Activating brakes 348 on capture head support members 308, 312, 316, 320, 324, and 328 locks each of the non-cooperative capture device pads 344 into the current position and orientation. Each of the non-cooperative capture device pads 344 conforms to the shape of the object 124 when the control apparatus 128 activated the non-cooperative capture device 120 in block 1028. Activating the brakes 348 preserves the current conformed position and orientation of the non-cooperative capture device pads 344, and ensures that the intimate contact established in step 1032 will be preserved. Flow proceeds to block 1044.

At block 1044, the control apparatus 128 arrests the object 124 motion. Arresting the object 124 motion includes imparting forces through the boom 104 and capture head 116 to reduce the velocity of the object 124 such that the object 124 is moving at a desirable speed and direction, or not moving. Flow proceeds to blocks 1048 and 1052.

At block 1048, the control apparatus 128 moves the object 124. The object 124 is able to be moved into a position relative to the fixed surface 100 based on the size, complexity, and flexibility of the boom 104 and capture head 116. Flow ends at block 1048.

At block 1052, the control apparatus 128 disengages the boom 104 from the capture head 116. The coupling between the boom 104 and the capture head 116 allows separation between the boom free end 112b and the capture head 116. Since the capture head 116 is rigidly captured to the object 124, the capture head 116 remains attached to the object 124 after the boom free end 112b is separated from the capture head 116. This then allows another boom 104 or other device to engage the capture head 116 at some time in the future. It should be noted that active electrical devices in the non-cooperative capture device 120 of the capture head 116 must continue to be activated after the boom 104 is separated from the capture head 116. Therefore, a power source suitable for powering the non-cooperative capture device 120 in the absence of power 608 from the boom 104 must be provided in the capture head 116. Flow ends at block 1052.

Referring now to FIG. 11, a flowchart illustrating an object 124 capture active process in accordance with a third embodiment of the present invention is shown. Flow begins at block 1104.

At block 1104, the control apparatus 128 moves a capture apparatus into proximity to the object 124. The capture apparatus includes a boom 104 and a capture head 116, where the capture head 116 includes a non-cooperative capture device 120. Proximity depends on the technology used for the non-cooperative capture device 120, based on the distance at which adhesive forces will be effective to initiate contact with the object 124.

In the case of electrostatic attraction technology, proximity depends on the number of electrodes in the non-cooperative capture device 120 and the ability of the conformal surface 336, 424, 428 to make intimate contact with the object 124 when the electrodes are energized.

In the case of gecko adhesion technology, proximity depends on the number, density, and configuration of nanofibrillar structures on the conformal surface of the non-cooperative capture device 336, 424, 428, and the ability of the nanofibrillar structures to make intimate contact with the object 124 when the conformal surface 336, 424, 428 is energized.

In the case of Velcro technology, proximity depends on the length of the Velcro nap and requires the Velcro nap to be barely touching the object 124. Initial contact in the case of Velcro then requires additional force to be exerted by the non-cooperative capture device 120 such that the conformal surface 336, 424, 428 is directly pushing against the object 124.

In the case of glue technology, proximity requires the glue to be barely touching the object 124. Initial contact in the case of glue then requires additional force to be exerted by the non-cooperative capture device 120 such that the conformal surface 336, 424, 428 is directly pushing against the object 124.

In the case of magnet or electromagnet technology, proximity requires sufficient distance between the non-cooperative capture device 120 and the object 124 in order for the non-cooperative capture device 120 to exert enough attraction force to cause the capture head 116 to move toward the object 124. Flow proceeds to decision block 1108.

At decision block 1108, the control apparatus 128 determines if the capture head 116 is close enough to the object 124 to capture the object 124. In the embodiments illustrated in FIGS. 6b and 6d, the capture head control module 624 instead of the control apparatus 128 may determine if the capture head 116 is close enough to the object 124 to capture the object 124. If the capture head 116 is close enough to the object 124 to capture the object 124 then flow proceeds to block 1116. If the capture head 116 is not close enough to the object 124 to capture the object 124, then flow instead proceeds to block 1112.

At block 1112, the control apparatus 128 (or capture head control module 624) moves the capture apparatus into closer proximity to the object 124. In some cases, it will be required to move the boom 104 in order to move the capture head 116 close enough to the object 124 to capture the object 124. In other cases, it will be required to move the capture head 116 relative to the boom 104 in order to move the capture head 116 close enough to the object 124 to capture the object 124. In yet other cases, it will be required to cause capture head actuators 444 in the capture head 116 itself to move in order to move the capture head 116 close enough to the object 124 to capture the object 124. Flow proceeds to decision block 1108.

At block 1116, the control apparatus 128 minimizes relative velocity between the capture head 116 and the object 124. It is important to minimize relative velocity between the capture head 116 and the object 124 in order to minimize relative forces between the capture head 116 and the object 124, and maximize the amount of time the non-cooperative capture device 120 is close to the object 124. At this time, the object 124 is not yet captured. Therefore, the boom 104 and capture head 116 are moved to match the current speed and direction of the object 124. Flow proceeds to blocks 1132 and 1136.

At block 1120, the control apparatus 128 determines the shape, topography, and/or texture of the object 124. The control apparatus 128 uses one or more sensors 132 to identify the shape, topography, and/or texture of the object 124. The sensors 132 may be any combination of cameras, LIDAR devices, radar devices, or optical devices. By determining the shape, topography, and/or texture of the object 124, the control apparatus 128 is able to optimize the non-cooperative capture device 120 for capturing the object 124. Flow proceeds to block 1124.

At block 1124, the control apparatus 128 sends commands to the capture head 116 to adjust capture head actuators 444 to conform to the object 124 shape, topography, and/or texture as identified by sensors 132 in block 1120. Flow proceeds to block 1128.

At block 1128, the capture head 116 adjust the capture head actuators 444 to conform to the object 124 shape, topography, and/or texture. At this point, the non-cooperative capture device pads 440 are preloaded in order to closely approximate the shape, topography, and/or texture of the object 124 in closest proximity to the non-cooperative capture device 120. Flow proceeds to blocks 1132 and 1136.

At block 1132, the non-cooperative capture device 120 makes initial contact with the object 124. At this point, the conformal surface of the non-cooperative capture device 336, 424, 428 is exerting initial force against the object 124. Flow proceeds to block 1140.

At block 1136, the control apparatus 128 minimizes forces applied by the capture head 116 to the object 124. Forces are minimized in order to reduce the chance of the object 124 bouncing off the capture head 116 after initial contact is made. Sensors 132 in the capture head 116 can monitor the capture head 116 for forces imposed by the object 124. In response to the observed forces during initial contact, the control apparatus 128 provides commands to boom actuators 144, capture head actuators 444, and the capture head coupling 304, 404 to impart equal and opposite forces on the object 124. Such force feedback should be applied to the object 124 as fast as possible to minimize the chance of the object 124 bouncing off the capture head 116. Flow proceeds to block 1140.

At block 1140, the control apparatus 128 activates a non-cooperative capture device 120 in the capture head 116. In the case of electrostatic attraction and gecko adhesion technologies, activating the non-cooperative capture device 120 means energizing electrodes or nanofibrillar structures, respectively, in the non-cooperative capture device 120. In the case of Velcro, permanent magnets, and glues, activating the non-cooperative capture device 120 means slowly moving the conformal surface 336, 424, 428 toward the object 124. In the case of electromagnets, activating the non-cooperative capture device 120 means energizing electromagnets in the non-cooperative capture device 120. Flow proceeds to block 1144.

At block 1144, the non-cooperative capture device 120 establishes intimate contact with the object 124. With the non-cooperative capture device 120 activated, the conformal surface 336, 424, 428 continues to press against the object 124 and resiliently conforms to the object 124 shape, orientation, and/or texture. By resiliently conforming to the object 124 shape, orientation, and/or texture, the non-cooperative capture device 120 maximizes surface contact with the object 124 and thereby captures the object 124. Flow proceeds to block 1148.

At block 1148, the control apparatus 128 arrests the object 124 motion. Arresting the object 124 motion includes imparting forces through the boom 104 and capture head 116 to reduce the velocity of the object 124 such that the object 124 is moving at a desirable speed and direction, or not moving. Flow proceeds to blocks 1152 and 1156.

At block 1152, the control apparatus 128 moves the object 124. The object 124 is able to be moved into a position relative to the fixed surface 100 based on the size, complexity, and flexibility of the boom 104 and capture head 116. Flow ends at block 1152.

At block 1156, the control apparatus 128 disengages the boom 104 from the capture head 116. The coupling between the boom 104 and the capture head 116 allows separation between the boom free end 112*b* and the capture head 116. Since the capture head 116 is rigidly captured to the object 124, the capture head 116 remains attached to the object 124 after the boom free end 112*b* is separated from the capture head 116. This then allows another boom 104 or other device to engage the capture head 116 at some time in the future. It should be noted that active electrical devices in the non-cooperative capture device 120 of the capture head 116 must continue to be activated after the boom 104 is separated from the capture head 116. Therefore, a power source suitable of powering the non-cooperative capture device 120 in the absence of power 608 from the boom 104 must be provided in the capture head 116, as previously discussed. Flow ends at block 1156.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A device for non-cooperatively capturing an object, comprising:
   a boom, comprising:
   a fixed end coupled to a structure;
   a free end, wherein the free end is able to move relative to the structure; and
   one or more boom deployers for moving the free end of the boom relative to the structure;
   a capture head, coupled to the free end of the boom, comprising a non-cooperative capture device, wherein the non-cooperative capture device comprises one or more pads utilizing at least one of electrostatic attraction, gecko adhesion, Velcro, glue, low-temperature melt alloys and polymers, electromagnets, and magnets on the one or more pads to establish intimate contact between the capture head and the object, wherein the non-cooperative capture device does not incorporate a mechanical gripper; and
   a control apparatus,
   wherein the control apparatus controls the one or more boom deployers and capture head to move the capture head in proximity to the object, wherein the control apparatus determines if the capture head is close enough to the object to capture the object, wherein the control apparatus moves the capture head in closer proximity to the object if the control apparatus determines the capture head is not close enough to the object to capture the object, wherein the control apparatus minimizes relative velocity between the capture head and the object, capture, wherein the non-cooperative capture device makes initial contact with the object, wherein the control apparatus activates the non-cooperative capture device, wherein the non-cooperative capture device establishes intimate contact between the capture head and the object, wherein the device for non-cooperatively capturing an object arrests the object motion.

2. The device for non-cooperatively capturing an object of claim 1, the boom comprising a plurality of linearly coupled segments, wherein each linearly coupled segment is able to move independently of other linearly coupled segments.

3. The device for non-cooperatively capturing an object of claim 1, the boom comprising one or more linearly coupled segments, wherein the length of at least one linearly coupled segment is extendable and retractable, wherein the boom deployer comprises at least one boom actuator in each of the one or more linearly coupled segments.

4. The device for non-cooperatively capturing an object of claim 1, wherein the capture head comprises one or more articulated support members that control the position and orientation of the non-cooperative capture device pads, wherein the one or more articulated support members comprises one or more brakes that freeze the position of the one or more articulated support members when activated and when inactivated allow the non-cooperative capture device pads to conform to the shape of the object when in contact with the object, wherein the control apparatus inactivates the one or more brakes prior to the non-cooperative capture device making initial contact with the object.

5. The device for non-cooperatively capturing an object of claim 4, wherein when the one or more brakes are inactivated, each of the one or more articulated support members moves within the range of motion of the each of the one or more articulated support members subject to external forces including at least one of contact with the object or spring forces from one or more springs attached to each of the one or more articulated support members.

6. The device for non-cooperatively capturing an object of claim 1, wherein the capture head comprises one or more articulated support members comprising one or more capture head actuators that control the position and orientation of the one or more articulated support members, wherein the one or more articulated support members determine the position and orientation of the one or more non-cooperative capture device pads, wherein one or more sensors of the control apparatus determine the shape and topography of the object, and in response direct the capture head actuators to conform to the shape and topography of the object prior to the non-cooperative capture device making initial contact with the object.

7. The device for non-cooperatively capturing an object of claim 1, wherein the capture head is decoupled from the free end of the boom after the non-cooperative capture device establishes intimate contact between the capture head and the object.

8. The device for non-cooperatively capturing an object of claim 1, the non-cooperative capture device comprising a conformal surface that makes direct contact with the object, wherein the control apparatus causes the conformal surface to conform to at least one of shape, topography, and texture of the object.

9. The device for non-cooperatively capturing an object of claim 8, wherein one or more actuators in the capture head move the conformal surface to conform to at least one of the shape, topography, and texture of the object.

10. The device for non-cooperatively capturing an object of claim 1, the structure comprising one of a spacecraft, a space station, a space suited astronaut, and a satellite.

11. A method for non-cooperatively capturing an object, comprising:
  utilizing a control apparatus to move a capture apparatus into close proximity to the object, the capture apparatus comprising:
    a boom, comprising:
      a fixed end attached to a structure;
      a free end, wherein the free end is able to move relative to the structure; and
      a boom deployer for moving the free end of the boom; and
    a capture head, coupled to the free end of the boom comprising a non-cooperative capture device, wherein the non-cooperative capture device comprises one or more pads utilizing at least one of electrostatic attraction, gecko adhesion, Velcro, glue, low-temperature melt alloys and polymers, electromagnets, and magnets on the one or more of pads to establish intimate contact between the capture head and the object, wherein the non-cooperative capture device does not incorporate a mechanical gripper;
  determining if the capture head is close enough to the object to capture the object;
    if the capture head is not close enough to the object to capture the object, moving the capture head closer to the object with the control apparatus; and
    if the capture head is close enough to the object to capture the object:
      minimizing relative velocity, by the control apparatus, between the capture head and the object;
      preparing the capture head to make contact with the object;
      making initial contact between the non-cooperative capture device and the object; and
      activating the non-cooperative capture device, by the control apparatus;
      establishing intimate contact between the capture head and the object, by the control apparatus; and
      arresting the object motion, by the control and capture apparatus, wherein the control apparatus is able to move the object after the object motion is arrested.

12. The method for non-cooperatively capturing the object of claim 11, the boom comprising a plurality of linearly coupled segments, wherein each segment is able to move independently of other segments.

13. The method for non-cooperatively capturing the object of claim 11, the boom comprising one or more linearly coupled segments, wherein the length of at least one linearly coupled segment is extendable and retractable, wherein the boom deployer comprises at least one actuator in each of the one or more linearly coupled segments.

14. The method for non-cooperatively capturing an object of claim 11, wherein preparing the capture head to make contact with the object comprises:
  allowing the non-cooperative capture device pads to conform to the shape of the object when one or more brakes in one or more articulated support members are inactivated, wherein the control apparatus inactivates the one or more brakes prior to the non-cooperative capture device making initial contact with the object; and freezing the position of the one or more articulated support members when the one or more brakes in the one or more articulated support members is activated; wherein the control apparatus activates the brakes after establishing intimate contact between the capture head and the object, wherein the capture head comprises the one or more articulated support members that control the position and orientation of the non-cooperative capture device pads.

15. The method for non-cooperatively capturing an object of claim 11, wherein preparing the capture head to make contact with the object comprises:

determining, by one or more sensors of the control apparatus, the shape and topography of the object, and in response:

directing capture head actuators to conform to the shape and topography of the object prior to the non-cooperative capture device making initial contact with the object, wherein the capture head comprises one or more articulated support members comprising one or more capture head actuators that control the position and orientation of the one or more articulated support members, wherein the one or more articulated support members determine the position and orientation of the one or more non-cooperative capture device pads.

16. The method for non-cooperatively capturing the object of claim 11, further comprising the control apparatus decoupling the capture head from the free end of the boom after arresting the object motion.

17. The method for non-cooperatively capturing the object of claim 16, wherein the separated capture head comprises an attachment point for the same or a different boom to capture the capture head and object at a later time.

18. The method for non-cooperatively capturing the object of claim 11, the non-cooperative capture device comprising a conformal surface that makes direct contact with the object, the control apparatus causes the conformal surface to conform to at least one of the shape, topography, and texture of the object.

19. The method for non-cooperatively capturing the object of claim 18, wherein one or more capture head actuators move the conformal surface to conform to at least one of the shape, topography, and texture of the object.

20. An apparatus for non-cooperatively capturing an object in space, comprising:

a boom, comprising:

a fixed end coupled to a structure, wherein the structure is one of a spacecraft, a satellite, a space station, or a space suited astronaut; and a free end, wherein the free end is able to move relative to the structure, wherein the boom is expandable and retractable between the fixed and free end; and a capture head, coupled to the free end of the boom, comprising a non-cooperative capture device, the non-cooperative capture device comprising one or more pads utilizing a resettable adhesive to establish intimate contact between the capture head and the object; and a control apparatus for controlling movement of the capture head relative to the structure and engagement between the capture head and the object, wherein the control apparatus directs movement of the boom and capture head to move the capture head in proximity to the object, wherein the control apparatus determines if the capture head is close enough to the object to capture the object, wherein the control apparatus moves the capture head in closer proximity to the object if the capture apparatus determines the capture head is not close enough to the object to capture the object, wherein the control apparatus minimizes relative velocity between the capture head and the object, wherein the capture head comprises one or more articulated support members comprising one or more capture head actuators that control the position and orientation of the one or more articulated support members, wherein the one or more articulated support members determine the position and orientation of the one or more capture device pads, wherein one or more sensors of the control apparatus determine the shape and topography of the object, and in response direct the capture head actuators to conform to the shape and topography of the object prior to the non-cooperative capture device making initial contact with the object, wherein the non-cooperative capture device makes initial contact with the object, wherein the control apparatus activates a non-cooperative capture device in the capture head, wherein the non-cooperative capture device establishes intimate contact between the capture head and the object, wherein the apparatus for non-cooperatively capturing an object in space arrests object motion, wherein the control apparatus directs movement of the boom and capture head to move the object in space.

* * * * *